(12) United States Patent
Kagaya

(10) Patent No.: US 7,599,093 B2
(45) Date of Patent: Oct. 6, 2009

(54) IMAGE PROCESSING APPARATUS, METHOD AND PROGRAM

(75) Inventor: Makoto Kagaya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 607 days.

(21) Appl. No.: 11/235,147

(22) Filed: Sep. 27, 2005

(65) Prior Publication Data

US 2006/0066912 A1 Mar. 30, 2006

(30) Foreign Application Priority Data

Sep. 30, 2004 (JP) ............................. 2004-287488
Jan. 14, 2005 (JP) ............................. 2005-006963

(51) Int. Cl.
G06K 15/00 (2006.01)
H04N 1/40 (2006.01)
H04N 1/46 (2006.01)
H04N 9/73 (2006.01)

(52) U.S. Cl. ...................... 358/2.1; 358/504; 358/516; 348/223.1

(58) Field of Classification Search .................. 358/1.9, 358/2.1, 504, 516, 518, 538; 348/223.1
See application file for complete search history.

(56) References Cited

U.S. PATENT DOCUMENTS

| 2003/0038956 | A1* | 2/2003 | Aotsuka | 358/1.9 |
| 2003/0090750 | A1* | 5/2003 | Takahashi | 358/516 |
| 2003/0169348 | A1* | 9/2003 | Ikeda et al. | 348/223.1 |
| 2004/0170337 | A1* | 9/2004 | Simon et al. | 382/254 |

FOREIGN PATENT DOCUMENTS

| JP | 08-122944 A | 5/1996 |
| JP | 2001-103508 A | 4/2001 |
| JP | 2001-298629 A | 10/2001 |
| JP | 2002-152772 A | 5/2002 |
| JP | 2002-203239 A | 7/2002 |
| JP | 2003-209856 A | 7/2003 |
| JP | 2003-224735 A | 8/2003 |
| JP | 2003-299115 A | 10/2003 |

OTHER PUBLICATIONS

Japanese Patent Application 2005-254685 dated Jul. 7, 2009.

* cited by examiner

*Primary Examiner*—James A Thompson
(74) *Attorney, Agent, or Firm*—Sughrue Mion, PLLC

(57) ABSTRACT

A skin-tone image portion contained in an image is detected based upon the shape of the image of a human face. An average value of each of RGB values of pixels that constitute the skin-tone image portion detected is calculated. If the distance between a skin-tone—blackbody locus and a value that is the result of converting the RGB values obtained by multiplying the average value by prescribed coefficients is less than a prescribed value, these coefficients are adopted as coefficients for multiplying the RGB values of each pixel constituting the image. By using a value that is the result of converting, to a chromaticity value, the RGB values obtained by multiplying the RGB values of each of the pixels constituting the image by the prescribed coefficients, those pixels of the image that have values belonging to a zone in the vicinity of a point on a gray—blackbody locus that corresponds to a light-source color temperature estimated based upon the skin-tone—blackbody locus are treated as gray candidate pixels.

13 Claims, 21 Drawing Sheets

IMAGE PROCESSING APPARATUS, METHOD AND PROGRAM

BACKGROUND OF THE INVENTION

1. Field of the Invention

This invention relates to an image processing apparatus, method and program. More particularly, the invention relates to an apparatus, method and program for estimating the color temperature of a photographic light source based upon applied image data.

2. Description of the Related Art

Photo printing devices utilizing digital exposure, namely digital photo printers, are now in actual use. Such a printer optoelectronically reads an image that has been recorded on photographic film such as negative film or color reversible film, converts the read image to digital data and exposes a photosensitive material by recording light that has been modulated in accordance with the image data, thereby printing an image (a latent image) on photographic printing paper. Image data that has been obtained by a digital camera or mobile telephone equipped with a camera also is printed on photographic printing paper by a digital photo printer.

The state of image data handled by a digital photo printer is not necessarily uniform. For example, images are obtained by shooting pictures under various photographic light sources such as daylight, a fluorescent lamp or a tungsten lamp, etc. Accordingly, in a case where a print is created from image data, a tint that is based upon the photographic light source may be reflected in the print if the image is printed without applying image processing.

A white balance correction (gray balance correction) is available as correction processing for obtaining an image print that is unaffected by the photographic light source.

The white balance correction is processing that controls the color balance of an image represented by image data to thereby correct the image data in such a manner that the image of a subject will be expressed by the appropriate color [e.g., in such a manner that the image of a white-colored subject will be expressed by the color white and the image of a skin-toned subject (the face area of a human being) by the color of skin]. The white balance correction generally is performed when the picture is taken. At such time the color temperature that conforms to the picture-taking conditions (or the type of light source used) is set in the digital camera. The white balance correction that conforms to the set color temperature or type of light source is carried out and the image data that has undergone the white balance correction is stored on a memory card or the like.

In a case where the white balance of an image represented by digital image data is corrected not at the time of photography but subsequent thereto, it is necessary that the color temperature that prevailed when the image represented by the digital image data was captured be decided (estimated) based upon information obtained from the digital image data.

The specification of Japanese Patent Application Laid-Open No. 2003-209856 teaches the utilization of a blackbody locus (skin-tone—blackbody locus and gray—blackbody locus) on a chromaticity diagram to decide (estimate) the color temperature of a light source. The R and B components of RGB values of an image obtained by a digital camera are multiplied by prescribed coefficients α1, α2 and the values obtained are converted to chromaticity values r, b, respectively. Pixels in the vicinity of the skin-tone—blackbody locus represented on the chromaticity diagram are detected as skin-tone candidate pixels, and pixels in the vicinity of the gray—blackbody locus represented on the chromaticity diagram are detected as gray candidate pixels. The prescribed coefficients α1, α2 are optimized in such a manner that the number of skin-tone candidate pixels in the vicinity of the skin-tone—black locus and the number of gray-candidate pixels in the vicinity of the gray—blackbody locus will be maximized or in such a manner that the difference between average color temperature of a group of skin-tone candidate pixels and average color temperature of a group of gray pixels will be minimized. The color temperature of the light source is decided (estimated) using the color temperature of skin-tone pixels detected based upon the skin-tone—blackbody locus and the color temperature of gray pixels detected based upon the gray—blackbody locus.

Thus, in the specification set forth above, if the values obtained by multiplying the R and B components of RGB values of an image obtained by a digital camera by the prescribed coefficients α1, α2 and converting the products to the chromaticity values r, b are indicative of pixels in the vicinity of the skin-tone—blackbody locus represented on the chromaticity diagram, then these pixels are adopted as skin-tone pixels; if the chromaticity values obtained are indicative of pixels in the vicinity of the gray—blackbody locus, then these pixels are adopted as gray pixels. Often, however, an image prior to application of the white balance correction will not be in color balance. Consequently, there is a limitation upon the detection of skin-tone pixels and gray pixels using only color information as set forth in the above-cited specification. For example, it is conceivable that even if an image does not contain a skin-tone pixel and a gray pixel but does contain a pair of colors (e.g., pink and violet) in a relative color relationship with the skin-tone color and gray, then the pixels of these colors will be detected erroneously as skin-tone and gray pixels. As a result, the color temperature of the light source obtained in accordance with the skin-tone—blackbody locus and gray—blackbody locus may not be the appropriate light-source color temperature and there is the danger that the white balance correction will fail.

SUMMARY OF THE INVENTION

Accordingly, an object of the present invention is to estimate the color temperature of a light source comparatively accurately by accurately detecting gray pixels contained in an image represented by applied image data.

According to the present invention, the foregoing object is attained by providing an image processing apparatus comprising: skin-tone image area detecting means (a skin-tone image area detecting device) for detecting a skin-tone image area, which is contained in an image represented by applied image data, based upon image shape or image structure; gray pixel detecting means (a gray pixel detecting device) for detecting gray pixels contained in the image represented by the image data based upon color information obtained from pixels that constitute the skin-tone image area that has been detected by the skin-tone image area detecting means; and color temperature estimating means (a color temperature estimating device) for estimating color temperature of a photographic light source based upon gray pixels that have been detected by the gray pixel detecting means.

According to the present invention, the foregoing object is attained by providing an image processing method comprising the steps of: detecting a skin-tone image area, which is contained in an image represented by applied image data, based upon image shape or image structure; detecting gray pixels contained in the image represented by the image data based upon color information obtained from pixels that constitute the skin-tone image area that has been detected; and estimating color temperature of a photographic light source based upon gray pixels that have been detected.

According to the present invention, the foregoing object is attained by providing a program for image processing, the program causing a computer to execute skin-tone image area detection processing for detecting a skin-tone image area, which is contained in an image represented by applied image data, based upon image shape or image structure; gray pixel detection processing for detecting gray pixels contained in the image represented by the image data based upon color information obtained from pixels that constitute the skin-tone image area that has been detected by the skin-tone image area detection processing; and color temperature estimation processing for estimating color temperature of a photographic light source based upon gray pixels that have been detected by the gray pixel detection processing.

The image processing apparatus, method and program according to the first aspect of the present invention are suited to a white balance correction (gray balance correction and color balance correction). The white balance correction corrects the ratio of RGB values of pixels that constitute an image in such a manner that a white or gray image will take on a prescribed tint. By estimating the color temperature of a light source at the time of image data acquisition (i.e., when a picture is taken), a value for white balance correction (a white balance correction value or a white balance correction coefficient) can be calculated (decided). In a case where the invention is used as a white balance correction apparatus, the image processing apparatus according to the present invention further comprises white balance correction value calculating means for calculating white balance correction values (correction coefficients); and white balance correcting means for applying a white balance correction to the image data using the correction values that have been calculated by the white balance correction value calculating means.

If a gray pixel can be detected directly based upon image data, then the color temperature of the light source can be estimated based upon the detected gray pixels and the white balance correction values can be calculated based upon the estimated color temperature of the light source. However, it is difficult to detect gray pixels directly based upon image data. Accordingly, the image processing apparatus according to the present invention first detects a skin-tone image area based upon applied image data and then detects gray pixels based upon color information that is based upon the skin-tone image area. It should be noted that if a gray pixel has the proper white balance, then it will be a pixel having a value (a value of color temperature) that is on or in the vicinity of a blackbody locus with regard to gray (namely a gray—blackbody locus).

A skin-tone image area signifies an image area (a portion of an image) contained in an image represented by the applied image data and having a specific shape or structure containing a skin tone. The image processing apparatus according to the present invention focuses on the shape or structure of an image to detect a skin-tone image area in an image represented by the applied image data.

Images representing the face, torso, hands or feet, etc., of a human being can be mentioned as examples of skin-tone image areas detected based upon image shape or image structure. These image areas have a specific shape or structure and therefore can be detected (partitioned or extracted) from the applied image data (image data representing the entire image).

Preferably, the skin-tone image area is detected based upon the face image area of a person. The face image area of a person is an image area that generally contains skin tones. Further, a subject that image of which is sensed as by a digital still camera often contains the face of a person. By detecting the face image area of a person based upon shape or structure, a skin-tone image area can be acquired reliably.

Each pixel that constitutes the skin-tone image area contains color information. For example, 8-bit data regarding each of R, G, B exists for every pixel. A gray pixel contained in the image represented by the image data is detected based upon the color information obtained from the pixels constituting the skin-tone image area.

In an embodiment, the gray pixel detecting means includes first coefficient multiplying-means for multiplying a representative value (e.g., an average value, mode or median) of color information obtained from each pixel constituting a skin-tone image area by prescribed coefficients; first chromaticity value converting means for converting the skin-tone-area representative value, which has been calculated by multiplication by the prescribed coefficients in the first coefficient multiplying means, to a representative chromaticity value; determination means for determining whether the skin-tone-area representative chromaticity value obtained by the first chromaticity value converting means lies within a zone in the vicinity of a skin-tone—blackbody locus; provisional color temperature estimating means for estimating that a color temperature corresponding to a point on the skin-tone—blackbody locus nearest the skin-tone-area representative chromaticity value is a provisional color temperature if the determination means has determined that the skin-tone-area representative chromaticity value lies within the zone in the vicinity of the skin-tone—blackbody locus; second coefficient multiplying means for multiplying color information, which is obtained from pixels constituting the image represented by the image data, by the aforesaid prescribed coefficients that will cause the skin-tone-area representative chromaticity value to fall within the zone in the vicinity of the skin-tone—blackbody locus; and second chromaticity value converting means for converting a plurality of pixel values, which have been obtained by multiplication by the prescribed coefficient by the second coefficient multiplying means, to chromaticity values; wherein from among the pixels that constitute the image represented by the image data, there are specified pixels for which the representative chromaticity values obtained by the second chromaticity value converting means will fall within a zone in the vicinity of a point on a gray—blackbody locus corresponding to the provisional color temperature that has been estimated by the provisional color temperature estimating means, and the specific pixels are detected as gray pixels.

The skin-tone image area detected by the skin-tone image area detecting means is detected based upon image shape or image structure. If the white balance (color balance) of the applied image data is appropriate, therefore, a value (chromaticity value) obtained from the skin-tone image area will be on or near a skin-tone—blackbody locus that corresponds to a prescribed color temperature. If the white balance of the applied image data is not appropriate, then a value (chromaticity value) obtained from the skin-tone image area will depart from a point on the skin-tone—blackbody locus of from the vicinity thereof. If the skin-tone-area representative chromaticity value obtained by multiplication by the prescribed coefficients in the first coefficient multiplying means and conversion in the first chromaticity value converting means lies in a zone in the vicinity of the skin-tone—blackbody locus, a pixel (virtual pixel) having the representative value (average value, mode or median) obtained from the pixels constituting the skin-tone image area prior to coefficient multiplication will come to reside on or near the skin-tone—blackbody locus by being multiplied by the prescribed coefficients.

If it has been determined that the skin-tone-area representative chromaticity value obtained by coefficient multiplication lies within a zone in the vicinity of the skin-tone—blackbody locus, the color temperature that corresponds to a point on the skin-tone —blackbody locus nearest this skin-tone-area representative chromaticity value is assumed to be the provisional color temperature. The above-mentioned prescribed coefficients (the aforesaid prescribed coefficients that cause the skin-tone-area representative chromaticity value to fall within the zone in the vicinity of the skin-tone—blackbody locus) are used to multiply color information obtained from the pixels that constitute the image represented by the image data, and a conversion is subsequently made to a chromaticity value (a coefficient-multiplied pixel chromaticity value is calculated). From among the pixels that constitute the image represented by the image data, there are specified pixels for which the representative chromaticity values obtained by the second chromaticity value converting means will fall within a zone in the vicinity of a point on a gray—blackbody locus corresponding to the provisional color temperature that has been-estimated by the provisional color temperature estimating means, and the specific pixels are detected as gray pixels.

The color temperature of a photographic light source is estimated based upon detected gray pixels. For example, the color temperature of each specified gray pixel that has been detected is calculated and the average value of the calculated color temperatures is adopted as the color temperature of the light source.

In accordance with the present invention, gray pixels are specified using the color information of a skin-tone image area contained in image data that has been input. The color temperature of a photographic light source can be estimated comparatively accurately by specifying the gray pixels. Since a skin-tone image area is detected based upon the image shape or structure, it can be detected without being affected by the color balance of the image regardless of what the color balance of the image, which is represented by the applied image data, might be. The skin-tone image area can be detected more reliably in comparison with detection of the skin-tone image area that is based upon color information. The gray pixels are detected based upon the color information of the skin-tone image area detected based upon image shape or structure. Since the gray pixels are detected in accordance with a skin-tone image area that is detected comparatively accurately, the gray pixels can be detected with much higher accuracy in comparison with detection of gray pixels that are based upon color information alone. This means that erroneous detection of gray pixels can be prevented comparatively reliably and that the color temperature of a photographic light source can be estimated comparatively accurately.

It may be arranged to prepare (store in a storage device) data representing a skin-tone—blackbody locus on a per-race basis (e.g., for the white, yellow and black races) beforehand and use the skin-tone—blackbody locus that conforms to the race of the person contained in the image represented by the image data to be processed. In this case, the image processing apparatus is provided with race designating means for designating the race of a person contained in the image represented by the image data to be processed, with skin-tone—blackbody locus data regarding the race designated by the race designating means being used in subsequent processing.

It may be arranged to prepare (store in a storage device) data representing a skin-tone—blackbody locus and data representing a gray—blackbody locus for every model of image sensing apparatus (every model of camera, etc.) beforehand and use the skin-tone—blackbody locus and gray—blackbody locus that conform to the model of the image sensing apparatus that was used to acquire the image data to be processed. In this case, the image processing apparatus is provided with image sensing apparatus designating means for designating the model of the image sensing apparatus that was used to acquire the image data to be processed, with skin-tone—blackbody locus data and gray—blackbody locus data regarding the image sensing apparatus designated by the image sensing apparatus designating means being used in subsequent processing.

It may be so arranged that in a case where tag information accompanies image data to be processed and the tag information contains data specifying a camera model, the skin-tone—blackbody locus data and gray—blackbody locus data are selected based upon the camera-model specifying data contained in the tag information.

In a preferred embodiment, the image processing apparatus further comprises optimizing coefficient searching means for searching for prescribed coefficients, which will cause the coefficient-multiplied skin-tone-area representative chromaticity values to fall within the zone in the vicinity of the skin-tone—blackbody locus, and for which the number of gray pixels is maximized; the first and second coefficient multiplying means using the prescribed coefficients found by the optimization coefficient searching means. By using the prescribed coefficients for which the number of detected gray pixels is maximized, a large number of gray pixels that are contained in the image represented by the applied image data can be detected. The color temperature of the photographic light source estimated based upon the detected gray pixels can be made more accurate.

In a preferred embodiment, the image processing apparatus further comprises color temperature range narrowing means which, based upon the color information obtained from the pixels that constitute the skin-tone image area detected by the skin-tone image area detecting means, is for narrowing the range of color temperatures of a photographic light source that are to be possessed by gray pixels to be detected; the gray pixel detecting means adopting pixels, which have color temperatures that fall within the range of color temperatures narrowed by the color temperature range narrowing means, as detection candidates, and detecting gray pixels from among these detection candidates.

Before execution of processing for detecting gray pixels, the range of color temperatures of a photographic light source that pixels to be detected should possess is narrowed down based upon color information obtained from the pixels constituting the skin-tone image area. Although only color information obtained from a skin-tone image area detected by the skin-tone image area detecting means cannot be construed as being sufficient for estimating the color temperature of a photographic light source, it is effective for deciding a range of color temperatures having a certain spread. Further, in a case where image data to be processed is data that has been obtained by sensing an image under a light source, such as a fluorescent lamp, not suited to measurement of blackbody radiation (namely a light source that is not a blackbody radiation light source), the range of color temperatures of a photographic light source that are to be possessed by gray pixels to be detected is narrowed down, thereby making it possible to prevent the detection of gray pixels that are inappropriate (i.e., to prevent the color temperature of an inappropriate photographic light source from being estimated).

In an embodiment, the color temperature range narrowing means includes third coefficient multiplying means for multiplying a representative value of color information, which is obtained from the pixels that constitute the skin-tone image area that has been detected by the skin-tone image area, detecting means, by each of a plurality of prescribed coefficients; third chromaticity value converting means for converting a plurality of the skin-tone-area representative values, which have been calculated by multiplication by the prescribed coefficients by the third coefficient multiplying means, to representative chromaticity values; and coefficient range searching means for searching for a range of the prescribed coefficients used in calculation of the skin-tone-area representative chromaticity values, these prescribed coefficients being such that distances between the plurality of coefficient-multiplied skin-tone-area representative chromaticity values obtained by the third chromaticity value converting means to a value on the skin-tone—blackbody locus nearest a skin-tone-area representative chromaticity value obtained by conversion, to a chromaticity value, of a representative value of color information obtained from the pixels that constitute the skin-tone image area, will fall within a prescribed distance.

If the white balance (color balance) of applied image data is suitable and the photographic light source used when the applied image data was acquired is a light source suited to measurement of black radiation (e.g., if the light source is sunlight or the like), then color information obtained from a skin-tone image area, e.g., a representative chromaticity value (the average value, mode or median of chromaticity values obtained from the pixels that constitute the skin-tone image area), will reside on or near the skin-tone—blackbody locus that corresponds to a prescribed color temperature. The gray pixels contained in the image represented by the image data will reside on or near the gray—blackbody locus that corresponds to the prescribed temperature.

If the white balance (color balance) of applied image data is not suitable, then, even if the photographic light source used when the applied image data was acquired is a light source suited to measurement of black radiation, a representative chromaticity value obtained from the skin-tone image area will not be on or near the skin-tone—blackbody locus and the chromaticity value of a gray pixel will not fall on or near the gray—blackbody locus either. If the photographic light source used when the applied image data was acquired is a light source (e.g., a fluorescent lamp) not suited to measurement of black radiation, then detection of gray pixels utilizing the skin-tone—blackbody locus and gray—blackbody locus will be low in accuracy because the skin-tone—blackbody locus and gray—blackbody locus are based on the assumption that the light source is one suited to measurement of black radiation.

Accordingly, in order to so arrange it that a decline in accuracy of detection of gray pixels utilizing the skin-tone—blackbody locus and gray—blackbody locus can be suppressed even if the photographic light source used when the applied image data was acquired is not one suited to measurement of black radiation (i.e., is not a blackbody radiation light source), the apparatus executes processing for narrowing the range of color temperatures of the photographic light source that should be possessed by gray pixels to be detected, this being performed based upon the color information obtained from the pixels constituting the skin-tone image area detected by the skin-tone image area detecting means. Since the skin-tone image area is detected based upon image shape or structure, the skin-tone image area can be detected comparatively accurately even if the photographic light source is, say, a fluorescent lamp. A skin-tone image area contains many skin-tone pixels with a substantially high degree of certainty. This fact is utilized to execute the processing that narrows the range-of color temperatures of the photographic light source that the gray pixels to be detected should possess.

The range of color temperatures of a photographic light source that should be possessed by the gray pixels to be detected corresponds to the range of prescribed coefficients mentioned above. If a skin-tone-area representative chromaticity value, which is obtained by multiplying color information obtained from a skin-tone image area by prescribed coefficients and converting the product to a chromaticity value, falls on or in a zone near the skin-tone—blackbody locus, then these prescribed coefficients are adopted as candidates for prescribed coefficients for detecting gray pixels. Prescribed coefficients that belong to a narrowed range of coefficients (these prescribed coefficients are some of a plurality of prescribed coefficients in the initial state) are used in subsequent processing.

With gray pixels having color temperatures that fall within the range of color temperatures narrowed by the color temperature range narrowing means serving as detection candidates, the gray pixel detecting means detects gray pixels contained in the image represented by the image data based upon color information obtained from pixels that constitute the skin-tone image area that has been detected by the skin-tone image area detecting means.

In accordance with the present invention, the range of color temperatures of a photographic light source that should be possessed by the gray pixels to be detected (the range of prescribed coefficients) is narrowed down based upon color information obtained from a skin-tone image area detected based upon image shape or structure, and gray pixels are detected using gray pixels that possess the narrowed-down range of color temperatures being adopted as the detection candidates (i.e., using prescribed coefficients that fall within a set range of prescribed coefficients). Gray pixels can be specified (detected) comparatively accurately even if the type of light source used when the image data was acquired is one such as a fluorescent lamp.

The prescribed coefficients may be divided into two groups, namely a group of prescribed coefficients that belong to a search range and a group of prescribed coefficients that do not belong to a search range, and prescribed coefficients that are to be used in detecting gray pixels may be decided from among the prescribed coefficients that belong to the search range. Distances are calculated between a plurality of skin-tone-area representative chromaticity values, which have been obtained by coefficient multiplication, and a value on the skin-tone—blackbody locus nearest a skin-tone-area representative chromaticity value obtained by conversion, to a chromaticity value, of a representative value of color information obtained from pixels constituting the skin-tone image area, and each of the plurality of prescribed coefficients is weighted in accordance with the calculated distances. For example, the shorter the calculated distance, the larger the value applied as the weight. The reason for this is that the closer the prescribed coefficients bring a skin-tone-area representative chromaticity value to the skin-tone—blackbody locus, the more suitable the prescribed coefficients are for detecting gray pixels.

Color temperature range narrowing means using weighting includes third coefficient multiplying means for multiplying a representative value of color information, which is obtained from the pixels that constitute the skin-tone image area that has been detected by the skin-tone image area detecting means, by each of a plurality of prescribed coefficients; third chromaticity value converting means for converting a plurality of the skin-tone-area representative values, which have been calculated by multiplication by the prescribed coefficients by the third coefficient multiplying means, to representative chromaticity values; and weighting means for calculating distances between the plurality of skin-tone-area representative chromaticity values, which have been obtained by the third coefficient converting means, and a value on the skin-tone—blackbody locus nearest a skin-tone-area representative chromaticity value obtained by conversion, to a chromaticity value, of a representative value of color information obtained from the pixels that constitute the skin-tone image area, and weighting each of the plurality of prescribed coefficients in accordance with the distances calculated. The gray pixel detecting means includes fourth coefficient multiplying means for multiplying a representative value of color temperature obtained from the pixels constituting the skin-tone image area by the prescribed coefficients; fourth chromaticity value converting means for converting the skin-tone-area representative value, which has been calculated by multiplication by the prescribed coefficient by the fourth coefficient multiplying means, to a chromaticity value; determination means for determining whether the skin-tone-area representative chromaticity value obtained by the fourth chromaticity value converting means lies within a zone in the vicinity of the skin-tone—blackbody locus; provisional color temperature estimating means for estimating that a color temperature corresponding to a point on the skin-tone—blackbody locus nearest the skin-tone-area representative chromaticity value is a provisional color temperature if the determination means has determined that the skin-tone-area representative chromaticity value lies within the zone in the vicinity of the skin-tone—blackbody locus; fifth coefficient multiplying means for multiplying color information, which is obtained from pixels constituting the image represented by the image data, by prescribed coefficients that will cause the skin-tone-area representative chromaticity value to fall within the zone in the vicinity of the skin-tone—blackbody locus; and fifth chromaticity value converting means for converting a plurality of pixel values, which have been obtained by multiplication by the prescribed coefficient by the fifth coefficient multiplying means, to chromaticity values; wherein from among the pixels that constitute the image represented by the image data, there are specified pixels for which the representative chromaticity values obtained by the fifth chromaticity value converting means will fall within a zone in the vicinity of a point on a gray—blackbody locus corresponding to the provisional color temperature that has been estimated by the provisional color temperature estimating means, and the specific pixels are detected as gray pixels. The image processing apparatus is further provided with means for calculating an evaluation function value based upon number of gray pixels detected by the gray pixel detecting means and weights of the prescribed coefficients used in the fourth and fifth coefficient calculating means, by using such an evaluation function that the larger the number of gray pixels detected by the gray pixel detecting means, the smaller the value of the function, and the larger the weight regarding the prescribed coefficients, the smaller the value of the function; and optimizing coefficient searching means for searching for prescribed coefficients for which the evaluation function value will be minimized. The prescribed coefficients found by the optimizing coefficient searching means are used by the fourth and fifth coefficient multiplying means.

The larger the number of gray pixels detected and the greater the weighting, the smaller the evaluation function value. It is considered, therefore, that prescribed coefficients for which a smaller evaluation function value can be obtained is better suited to estimation of light-source color temperature. The color temperature of a photographic light source estimated based upon detected gray pixels can be made more accurate.

It may be so arranged that the evaluation function value is calculated, using such an evaluation function that the greater the number of gray pixels detected by the gray pixel detecting means, the greater the value of the function, and the greater the weighting of the prescribed coefficients, the greater the value of the function, based upon the number of gray pixels and the weights of the prescribed coefficients. In this case, prescribed coefficients for which the evaluation function value is maximized are found.

In a preferred embodiment, the image processing apparatus further comprises first lowering means for correcting the white balance correction value so as to weaken the correction effect of the white balance correction in a case where the difference between a representative value (e.g., a representative chromaticity value) of a skin-tone image area that has been subjected to a white balance correction by the white balance correcting means and a skin-tone image reference value is greater than a prescribed value. If the difference between a representative value of a skin-tone image area after application of the white balance correction and the skin-tone image reference value is greater than a prescribed value, there is a possibility that the detection of gray pixels (the calculation of white balance correction values) is not being performed appropriately. In such case the adverse effect upon the image data after the correction can be alleviated by correcting the white balance correction value so as to weaken the correction effect.

The image processing apparatus may further be provided with second lowering means for correcting the white balance correction value so as to weaken the correction effect of the white balance correction in a case where the number of gray pixels detected by the gray pixel detecting means is less than a prescribed value. The second lowering-means may be used in conjunction with the first lowering means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS (1) Regarding the Blackbody Locus

Figure 1:
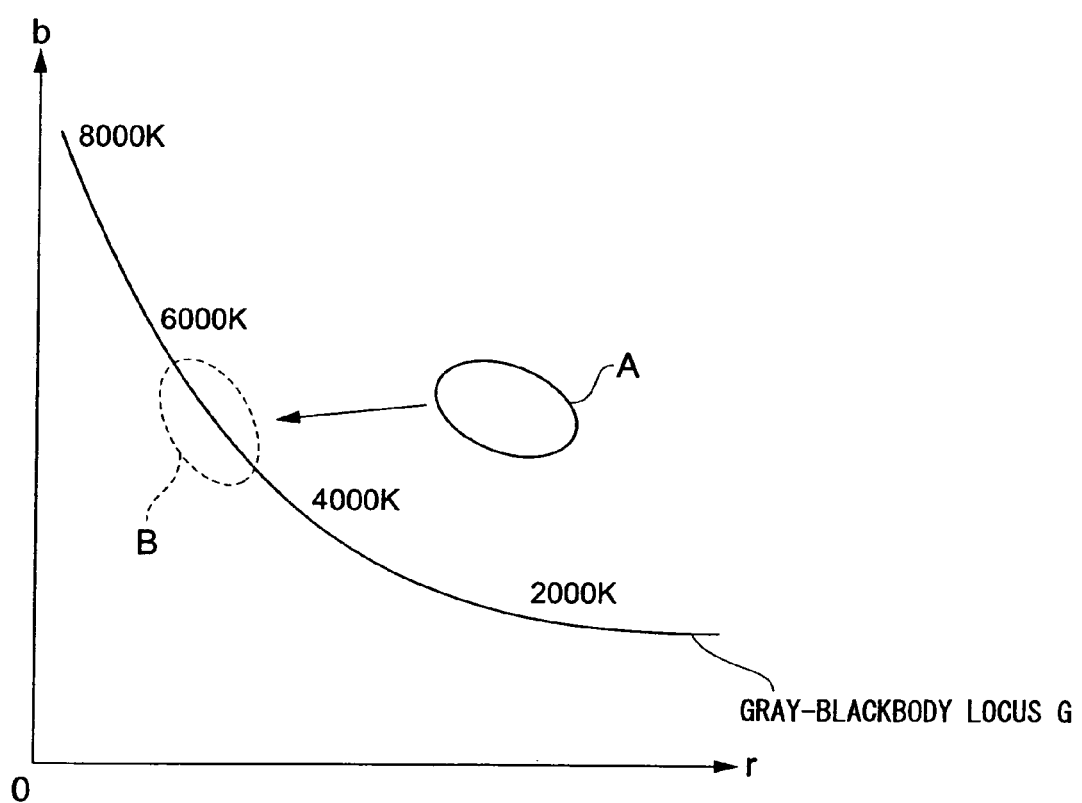
FIG. 1 is a chromaticity diagram illustrating a gray—blackbody locus G.

The blackbody locus will be described in brief. FIG. 1 illustrates a blackbody locus with regard to gray (this locus will be referred to as a "gray—blackbody locus G" below). The locus is shown in terms of chromaticity coordinates (in which r and b are plotted along the horizontal and vertical axes, respectively).

In this specification, the blackbody locus signifies a locus obtained when Ei, which is calculated in accordance with the following Equation (1), is converted to chromaticity values (r,b) and plotted on a chromaticity diagram and color temperature T is shifted:

$$Ei = \int P(\lambda)\rho(\lambda)Si(\lambda)d\lambda \qquad \text{Eq. (1)}$$

where $P(\lambda)$ represents the energy distribution of blackbody radiation of color temperature T, $\rho(\lambda)$ the distribution of spectral reflectance factors of a subject, and $Si(\lambda)$ the spectral-sensitivity distribution of a CCD sensor of a digital camera or the like (it should be noted that i=R, G, B holds and that $\lambda$ stands for wavelength).

The conversion to chromaticity values (r,b) of the RGB values is performed in accordance with Equations (2) below.

$$r = R/(R+G+B)$$
$$b = B/(R+G+B) \qquad \text{Eq. (2)}$$

The blackbody locus describes a locus that differs for every distribution $\rho(\lambda)$ of spectral reflectance factors, as evident from Equation (1). The distribution $\rho(\lambda)$ of spectral reflectance factors differs depending upon the color of the subject, and predetermined values are used for the distribution $\rho(\lambda)$ of spectral reflectance factors with regard to gray. Further, the blackbody locus describes a locus that differs also depending upon the spectral-sensitivity distribution $Si(\lambda)$ of a CCD sensor of a digital camera or the like. In a case where the a spectral-sensitivity distribution specific to a CCD sensor is unknown, or in a case where an image that has been sensed by a CCD sensor having a spectral-sensitivity distribution of a different characteristic is to undergo processing, a BT709 ideal spectral-sensitivity distribution can be used.

If the result of converting RGB values of a pixel, which constitutes an image obtained by adopting a gray blackbody (a full radiator) (an ideal object that absorbs energy completely) as the subject, to the chromaticity values (r,b) is plotted on a chromaticity diagram, it will be a plot at any point on the gray—blackbody locus G. Since the blackbody locus is a locus obtained in accordance with the color temperature T, the color temperature can be calculated in accordance with the plotted point.

A subject the image of which is sensed using a digital camera is not a blackbody (a full radiator) when the camera is utilized under ordinary conditions. Consequently, a chromaticity value obtained from digital image data acquired using a digital camera will not be a value on the gray—blackbody locus G even if an image contains a gray subject image. However, pixels plotted within a fixed zone centered on the gray —blackbody locus G can be handled as gray pixels on a chromaticity diagram.

If a gray pixel has a chromaticity value in the vicinity of the gray—blackbody locus G corresponding to a prescribed color temperature on a chromaticity diagram, the gray pixel can be expressed by a suitable gray color. That is, this means that the image data is image data for which the white balance (gray balance) is appropriate.

However, in case of an image that is not in color balance, there are instances where gray pixels that should be on or near the gray—blackbody locus G have chromaticity values (r,b) within the zone indicated at reference character A on the chromaticity diagram shown in FIG. 1. For example, if processing for performing a white balance correction in a digital camera is inappropriate, the image obtained by the digital image data will be such that the chromaticity values of gray pixels that should be in the zone indicated at B in the chromaticity diagram become the chromaticity values in the zone indicated at A.

In terms of the chromaticity diagram, the white balance correction signifies executing processing for moving gray pixels in the zone indicated at A to the zone indicated at B (an area that is in the vicinity of the gray—blackbody locus G and corresponds to a prescribed color temperature).

In order to perform an appropriate white balance correction, it is necessary to first accurately detect gray pixels, which are to be expressed by gray, from among pixels represented by the digital image data that is to be processed.

Further, in order to perform an appropriate white balance correction, it is necessary to find correction values (correction coefficients) for converting the chromaticity values of gray pixels in the zone indicated at A to chromaticity values in the zone indicated at B.

The digital printing system described below, rather than detecting gray pixels based solely upon color information of an image represented by digital image data and estimating the color temperature of the light source, detects a skin-tone area of a human being based upon image shape or image structure, detects gray pixels indirectly utilizing information obtained from the skin-tone area and estimates (decides) the color temperature of the light source.

(2) Digital Printing System

Figure 2:
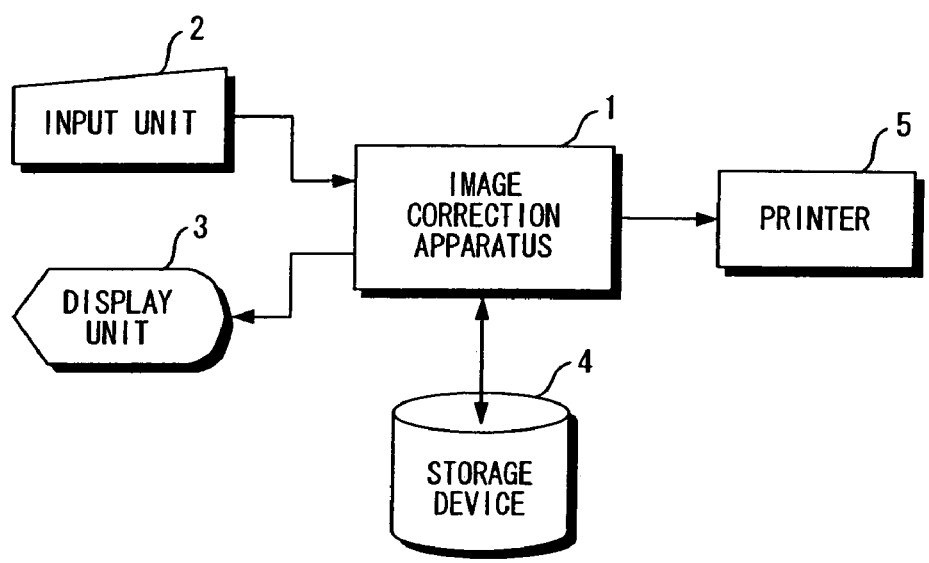
FIG. 2 is a block diagram illustrating the overall configuration of a digital printing system.

FIG. 2 is a block diagram schematically illustrating an embodiment of a digital photo printing system. The digital photo printing system applies a white balance correction to digital image data representing the images of subjects sensed under various types of light sources (color temperatures).

The digital photo printing system accurately detects a skin-tone area contained in an image represented by digital image data and detects gray pixels contained in the digital image based upon information obtained from the skin-tone area detected. That is, among all subjects photographed, the human skin can be cited as one that appears very frequently and therefore may serve as an effective subject for providing auxiliary information when gray pixels are detected. Human skin is such that its spectral reflectance factor differs depending upon the race (white, yellow, black, etc.) of the individual. However, the correlation on a wavelength-to-wavelength basis is close. That is, the skin of a human being is such that the RGB values per se differ depending upon race. If the chromaticity values are found, however, the values will be close. The digital photo printing system utilizes this property of human skin. Further, the digital photo printing system uses color temperature, which is obtained from information concerning the skin-tone area detected, in estimating the color temperature of the light source.

The digital photo printing system will be described below in detail.

As shown in FIG. 2, the digital photo printing system comprises an image correction apparatus 1 and peripheral devices (an input unit 2, display unit 3, storage device 4 and printer 5) connected to the image correction apparatus.

The input unit 2 (keyboard, mouse, etc.) connected to the image correction apparatus 1 is used in such operations as the designating of image data to be processed. A screen for selecting image data (an image file) to be processed and images represented by image data before and after correction are displayed on the display screen of the display unit 3. The storage device (hard disk, memory card, CD-ROM, DVD, etc.) 4 stores image data. The image correction apparatus 1 applies white balance correction processing to image data that has been read out of the storage device 4. The image represented by the image data after correction is printed on photographic printing paper or the like by the printer 5.

Figure 3:
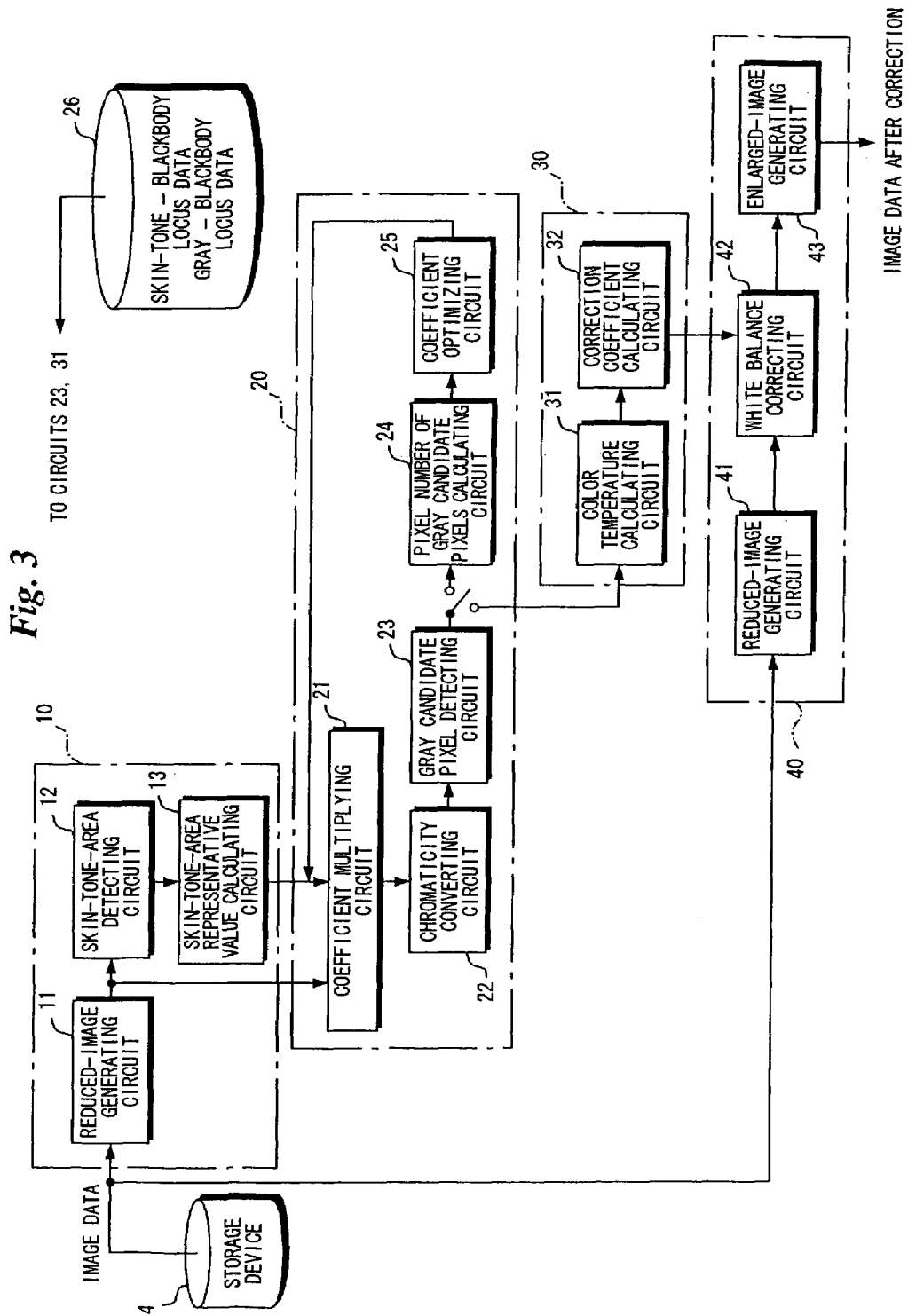
FIG. 3 is a block diagram illustrating the electrical structure of an image correction apparatus according to a first embodiment of the present invention.

FIG. 3 is a block diagram illustrating the electrical structure of the image correction apparatus 1, which is the apparatus at the core of this digital photo printing system, together with the storage device 4.

The circuits that construct the image correction apparatus 1 can be classified into the following four sections from the standpoint of function:

The first section is a unit 10 for calculating skin-tone-area representative values. The representative value calculating unit 10 detects a skin-tone area contained in an image represented by image data that has been read out of the storage device 4 as is to be processed, and calculates representative values (e.g., RGB values) obtained from the skin-tone area detected. The representative value calculating unit 10 comprises a reduced-image generating circuit 11, a skin-tone-area detecting circuit 12 and a circuit 13 for calculating skin-tone-area representative values.

The second section is a gray pixel detector 20. The latter detects gray pixels, which are contained in an image represented by image data to be processed, utilizing the skin-tone-area representative value obtained by the representative value calculating unit 10. The gray pixel detector 20 comprises a coefficient multiplying circuit 21, a chromaticity converting circuit 22, a gray candidate pixel detecting circuit 23, a pixel number calculating circuit 24 for calculating the number of gray candidate pixels, and a coefficient optimizing circuit 25.

The third section is a unit 30 for calculating white balance correction coefficients. The latter calculates correction coefficients for a white balance correction based upon the color temperature of each gray pixel contained in the image represented by the image data to be processed detected by the gray pixel detector 20. The calculating unit 30 comprises a color temperature calculating circuit 31 and a correction coefficient calculating circuit 32.

The fourth section is a white balance correcting unit 40. Using the white balance correction coefficients calculated by the white balance correction coefficient calculating unit 30, the white balance correcting unit 40 corrects the white balance of image data to be processed. The white balance correcting unit 40 comprises a reduced-image generating circuit 41, a white balance correcting circuit 42 and an enlarged-image generating circuit 43.

The image correction apparatus 1 is further provided with a memory 26 storing data (a table) representing a skin-tone—blackbody locus and data representing a gray—blackbody locus. As will be described later, the data representing the skin-tone—blackbody locus contains data (a table) that defines the relationship between the b value and color temperature T regarding the skin-tone—blackbody locus, and the data representing the gray—blackbody locus contains data (a table) that defines the relationship between the b value and color temperature T regarding the gray—blackbody locus. These items of data that have been stored in the memory 26 are used in processing executed in the gray candidate pixel detecting circuit 23 and color temperature calculating circuit 31 (the details will be described later).

The unit 10 for calculating skin-tone-area representative values, the gray pixel detector 20, the white balance correction coefficient calculating unit 30 and the white balance correcting unit 40 will now be described in the order mentioned.

(I) Unit 10 for Calculating Skin-tone-area Representative Values

As mentioned above, the representative value calculating unit 10 includes the reduced-image generating circuit 11, skin-tone-area detecting circuit 12 and circuit 13 for calculating skin-tone-area representative values.

In this embodiment, the image represented by the image data that has been stored in the storage device 4 is assumed to contain the face image of a human being and the image of a subject of the color gray. The image data that has been read from the storage device 4 is applied to the reduced-image generating circuit 11. The latter downsamples the applied image data to thereby generate image data of reduced size (of reduced number of pixels). The reduced-image generating circuit 11 is for the purpose of shortening the processing time of the image correction apparatus 1 and it may be so arranged that the processing executed by the reduced-image generating circuit 11 is turned on and off as necessary.

The reduced-image data that has been output from the reduced-image generating circuit 11 is used in subsequent processing. The reduced-image data is input to the skin-tone-area detecting circuit 12 and coefficient multiplying circuit 21 (the coefficient multiplying circuit 21 will be described later).

The skin-tone-area detecting circuit 12 is a circuit that detects (partitions, demarcates the boundary of, specifies) a skin-tone area in a face image contained in a reduced image represented by the reduced-image data. Since a human face has a prescribed shape and structure, processing for detecting a face image can be executed comparatively accurately by utilizing the shape and structure. Further, a human face positively contains skin tones. By taking note of these facts, the skin-tone-area detecting circuit 12 detects a face image in the reduced image and positively detects a skin-tone area contained in the face image.

Various conventional or novel detecting (partitioning) techniques can be used in processing for detecting (partitioning) a face image contained in a reduced image. For example, it is possible to use a method of detecting face-image portion by pattern matching (see the specification of Japanese Patent Application Laid-Open No. 8-122944). It is also possible to employ a method of detecting skin candidate areas (inclusive of hands, feet, etc.) in an input image and detecting those candidates that include the principal facial features (eyes, eyebrows, hair, nose and mouth) from among the skin candidate areas detected, thereby detecting a face-image portion from the skin candidate areas (see the specification of Japanese Patent Application Laid-Open No. 2002-203239). In any case, based upon the shape or structure of a human face, the skin-tone-area detecting circuit 12 detects a face portion representing a human face contained in a reduced image.

A human face has regions that include colors other than the color of skin (e.g., eyes, eyebrows, lips, etc.). It may be so arranged that pixels having these colors are eliminated from the face-image portion detected (for example, white- and black-color pixels are eliminated if the region is an eye, black-color pixels are eliminated if the region is an eyebrow, and red-color pixels are eliminated if the region is a lip).

The skin-tone-area detecting circuit 12 outputs RGB values of each of the plurality of pixels contained in the face-image portion detected. The RGB values of every pixel constituting the face-image portion are input to the circuit 13 that calculates skin-tone-area representative values.

The circuit 13 calculates an average value (tfR, tfG, tfB) of each of the R, G, B colors of every pixel contained in the face-image portion supplied from the skin-tone-area detecting circuit 12. The average value is adopted as a representative value (referred to as a "skin-tone-area representative value" below) obtained from the skin-tone area. A provisional pixel having this representative value shall be referred to as a "representative skin-tone pixel" below. A median or mode may be adopted instead of the average value as the representative value. The skin-tone-area representative value (tfR, tfG, tfB) is applied to the coefficient multiplying circuit 21 included in the gray pixel detector 20.

(II) Gray Pixel Detector 20

As mentioned above, the gray pixel detector 20 includes the coefficient multiplying circuit 21, chromaticity converting circuit 22, gray candidate pixel detecting circuit 23, circuit 24 for calculating number of gray candidate pixels, and coefficient optimizing circuit 25.

The gray pixel detector 20 detects gray pixels contained in a reduced image. The skin-tone-area representative value (tfR, tfG, tfB) calculated in the circuit 13, the skin-tone—blackbody locus H and the gray—blackbody locus G are used in detecting the gray pixels.

Figure 4:
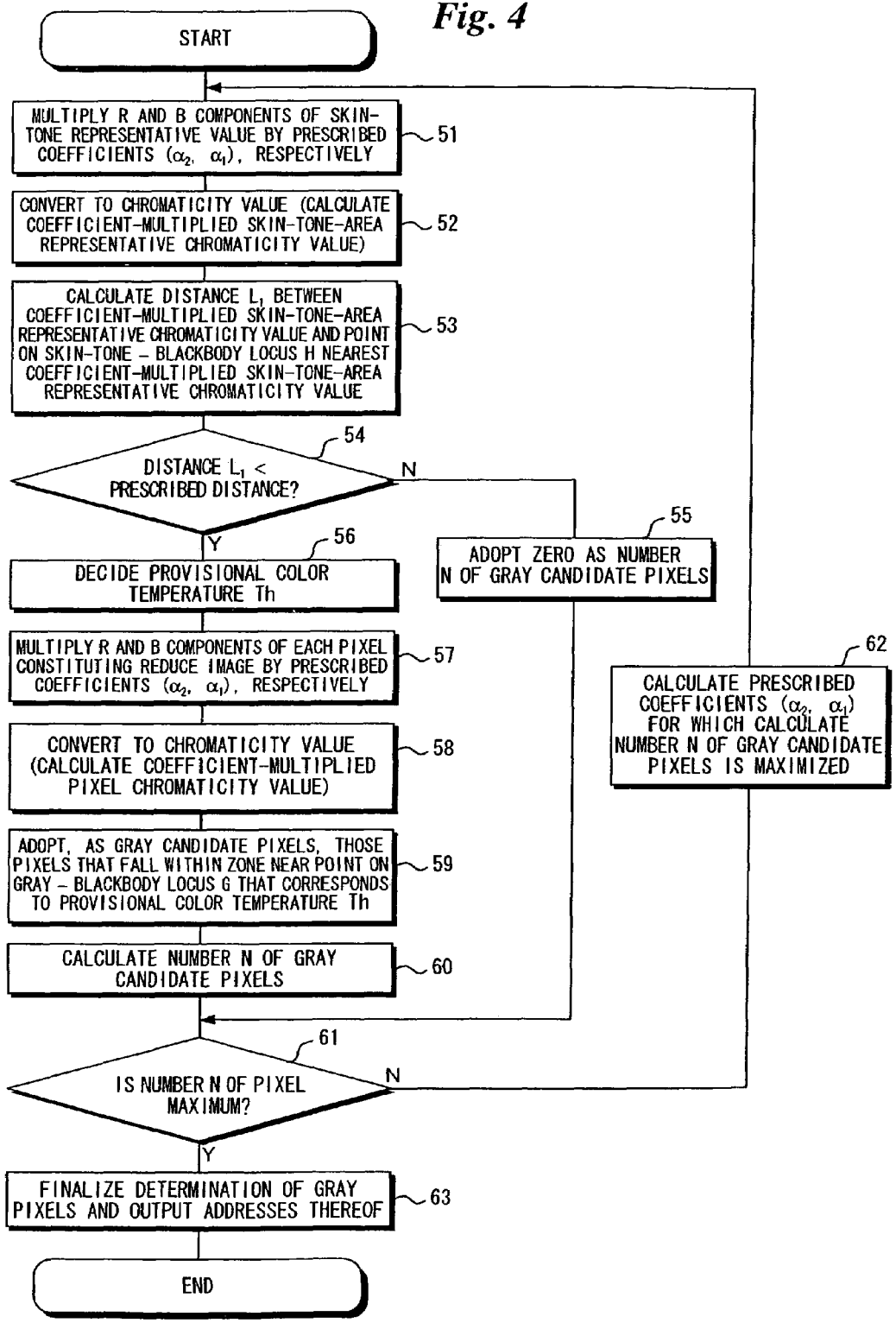
FIG. 4 is a flowchart illustrating the flow of processing executed by a gray pixel detector.

FIG. 4 is a flowchart illustrating the flow of processing executed by the gray pixel detector 20. FIGS. 5 to 8 are for describing the content of processing in the gray pixel detector 20 using chromaticity diagrams that include the skin-tone—blackbody locus H and gray—blackbody locus G. The processing executed in the coefficient multiplying circuit 21, chromaticity converting circuit 22, gray candidate pixel detecting circuit 23, pixel number calculating circuit 24 and coefficient optimizing circuit 25, which construct the gray pixel detector 20, will be described with reference to FIGS. 4 to 8, respectively.

The inputs to the coefficient multiplying circuit 21 are the skin-tone-area representative value (tfR, tfG, tfB) obtained by the circuit 13 that calculates this value and reduced-image data (RGB values regarding each of the plurality of pixels constituting a reduced image) generated by the reduced-image generating circuit 11.

The coefficient multiplying circuit 21 multiplies the R and G components of the skin-tone-area representative value (tfR, tfG, tfB) by prescribed coefficients (($\alpha2$, $\alpha1$), respectively (step 51). That is, coefficient-multiplied skin-tone-area representative values ($\underline{tfR}$, $\underline{tfG}$, $\underline{tfB}$) indicated by the following three equations are calculated in the coefficient multiplying circuit 21:

$\underline{tfR} = \alpha2 \cdot tfR$ $\underline{tfG} = \alpha1 \cdot tfG$ $\underline{tfB} = tfB$  Eq. (3)

In Equations (3), the reason for multiplying only the R and G components among the RGB values by the prescribed coefficients ($\alpha2$, $\alpha1$) is as follows: The white balance correction corrects the ratio of the RGB values, and the ratio of the RGB values can be controlled by the prescribed coefficients (($\alpha2$, $\alpha1$) that are used to multiply the R and G components among the RGB values. It goes without saying, however, that it may be arranged so that the B component also is multiplied by a prescribed coefficient. Further, it may be so arranged that only the R and B components or only the B and G components are multiplied by coefficients.

The coefficient-multiplied skin-tone-area representative values ($\underline{tfR}$, $\underline{tfG}$, $\underline{tfB}$) obtained in the coefficient multiplying circuit 21 are converted to a chromaticity value in the chromaticity converting circuit 22 [refer to Equation (2) for the conversion processing] (step 52). The chromaticity value will be referred to as a "coefficient-multiplied skin-tone-area representative chromaticity value ($r_1$, $b_1$)".

Next, the gray candidate pixel detecting circuit 23 executes processing that utilizes the coefficient-multiplied skin-tone-area representative chromaticity values ($r_1$, $b_1$) as well as the skin-tone—blackbody locus H and gray—blackbody locus G, etc., that have been stored in the memory 26. As mentioned above, the following have been stored in the memory 26 connected to the gray candidate pixel detecting circuit 23: skin-tone—blackbody locus data that defines the skin-tone—blackbody locus H; gray—blackbody locus data that defines the gray—blackbody locus G; data that contains the relationship between the chromaticity value b and color temperature T regarding the skin-tone—blackbody locus H (this data shall be referred to as "chromaticity value b vs. color temperature T data regarding skin-tone—blackbody locus H" below); and data that contains the relationship between the chromaticity value b and color temperature T regarding the gray—blackbody locus G (this data shall be referred to as "chromaticity value b vs. color temperature T data regarding gray—blackbody locus G" below).

First, by using the skin-tone—blackbody locus H and the chromaticity value b vs. color temperature T data regarding skin-tone—blackbody locus H, a provisional color temperature Th is calculated based upon the coefficient-multiplied skin-tone-area representative chromaticity value ($r_1$, $b_1$). The processing for calculating the provisional color temperature Th will be described with reference to FIGS. 5 and 6. It should be noted that the skin-tone—blackbody locus H is a locus defined by Equation (1) in a manner similar to that of the gray—blackbody locus G described earlier. The skin-tone—blackbody locus H differs from the gray—blackbody locus G only in the distribution $\rho(\lambda)$ of spectral reflectance factors in Equation (1).

Figure 5:
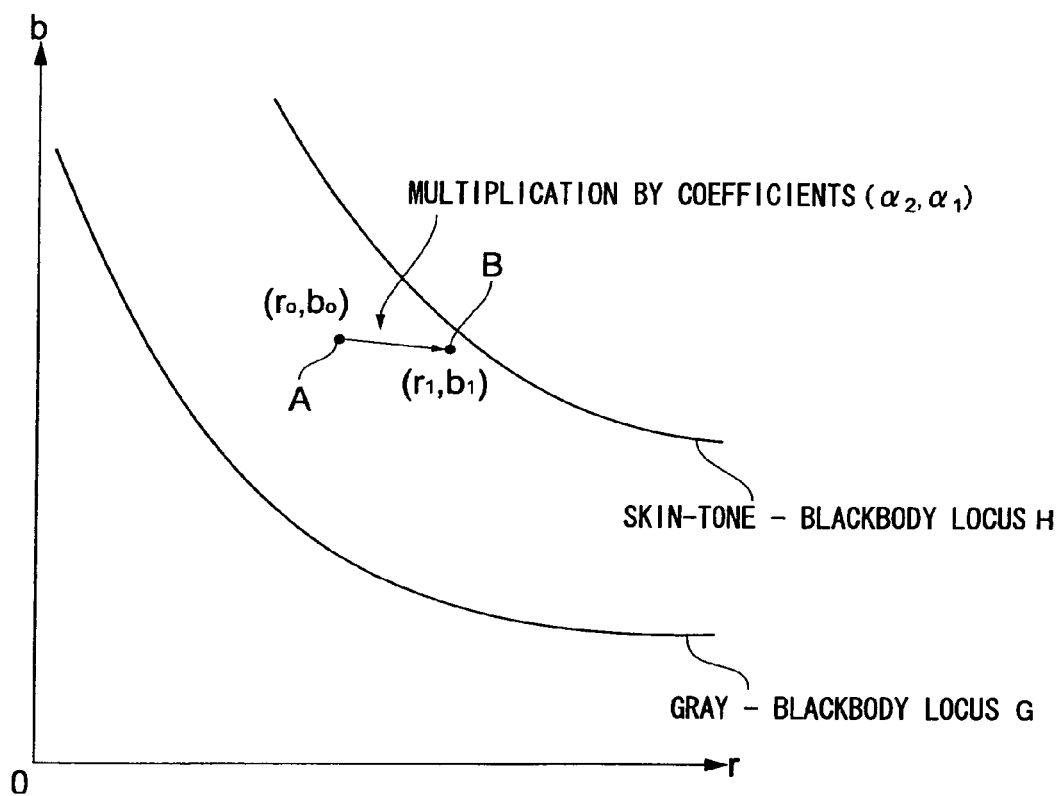
FIG. 5 illustrates a skin-tone—blackbody locus H, a gray—blackbody locus G, a plotted point A of a skin-tone-area representative chromaticity value and a plotted point B of a skin-tone-area representative chromaticity value obtained by coefficient multiplication, these being indicated on the chromaticity diagram.
Figure 6:
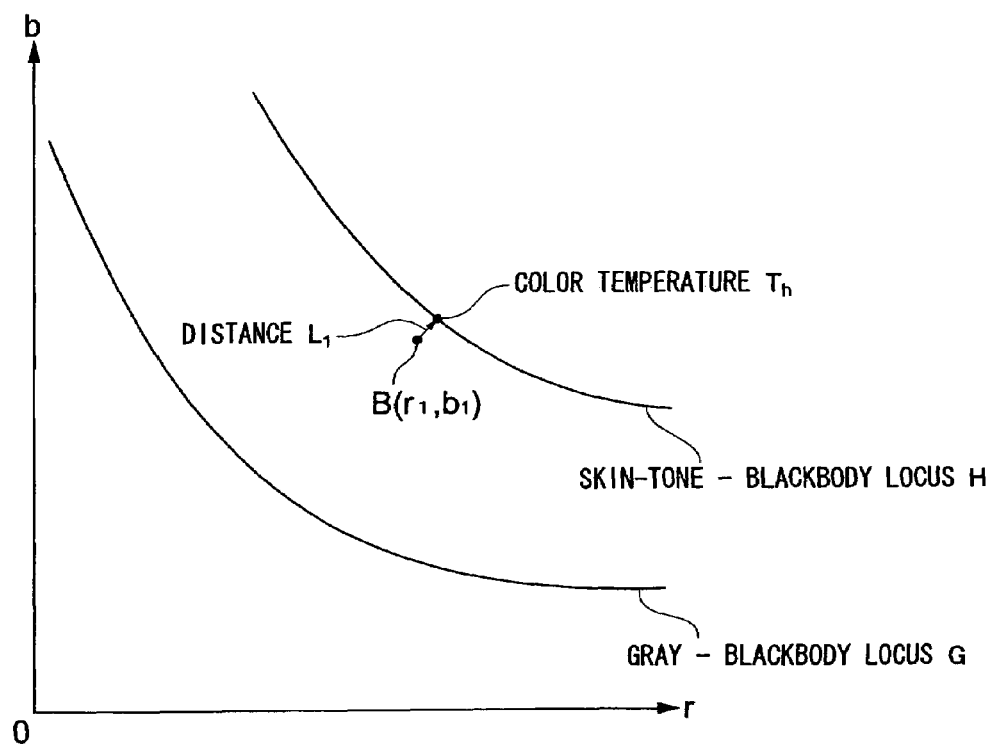
FIG. 6 illustrates the manner in which a provisional color temperature is found.

FIG. 5 illustrates a plotted point A ($r_0$,$b_0$) of a chromaticity value (skin-tone-area representative chromaticity value) obtained from the skin-tone-area representative value (tfR, tfG, tfB), and a plotted point B ($r_1$,$b_1$) of the coefficient-multiplied skin-tone-area representative chromaticity value. FIG. 6 illustrates the manner in which the provisional color temperature Th is found.

Thus, as described above, the coefficient-multiplied skin-tone-area representative chromaticity value B ($r_1$,$b_1$) is the result of multiplying the R and G components of a representative skin-tone pixel (skin-tone-area representative value) (tfR, tfG, tfB) by the prescribed coefficients ($\alpha 2$, $\alpha 1$) and converting the values obtained to the chromaticity value. The skin-tone-area representative chromaticity value A ($r_0$,$b_0$) and the coefficient-multiplied skin-tone-area representative chromaticity value B ($r_1$,$b_1$) are therefore plotted at different points on the chromaticity diagram (see FIG. 5).

The gray candidate pixel detecting circuit 23 calculates a point (r value, b value) on the skin-tone—blackbody locus H that is nearest the coefficient-multiplied skin-tone-area representative chromaticity value B ($r_1$,$b_1$). A distance L1 is calculated between the coefficient-multiplied skin-tone-area representative chromaticity value B ($r_1$,$b_1$) and the point (r value, b value) on the skin-tone—blackbody locus H nearest the coefficient-multiplied skin-tone-area representative chromaticity value B ($r_1$,$b_1$) (see FIG. 6) (step 53).

If the distance L1 between the coefficient-multiplied skin-tone-area representative chromaticity value B ($r_1$,$b_1$) and the point on the skin-tone—blackbody locus H nearest this point is equal to or greater than a prescribed value (e.g., 0.01), other new prescribed coefficients ($\alpha 2$, $\alpha 1$) are employed ("NO" at step 54; step 55; "NO" at step 61; step 62). The reason for this is as follows: If the distance between the coefficient-multiplied skin-tone-area representative chromaticity value B ($r_1$, $b_1$) and the point on the skin-tone—blackbody locus H nearest this point is equal to or greater than the prescribed value (e.g., 0.01), then the representative skin-tone pixel that will come to possess the coefficient-multiplied skin-tone-area representative chromaticity value B ($r_1$,$b_1$) obtained by multiplication using the prescribed coefficients ($\alpha 2$, $\alpha 1$) will not fall on or in a zone near the skin-tone—blackbody locus H despite multiplication by the prescribed coefficients ($\alpha 2$, $\alpha 1$) and, as a result, a gray pixel will not be capable of being detected accurately.

In other words, the representative skin-tone pixel is an appropriate skin-tone pixel obtained from the face-image portion of a human being, which is contained in the input image, based upon image shape or image structure. If it is assumed that the white balance (color balance) of the input image is appropriate, then the skin-tone-area representative chromaticity value A ($r_0$,$b_0$) obtained from the representative skin-tone pixel will fall on or in a zone near the skin-tone—blackbody locus H corresponding to the prescribed color temperature. If the white balance of the input image is inappropriate, however, then the skin-tone-area representative chromaticity value A ($r_0$,$b_0$) will not fall on or in a zone near the skin-tone—blackbody locus H (see FIG. 5). If the coefficient-multiplied skin-tone-area representative chromaticity value B ($r_1$,$b_1$) that is the result of multiplying the R and G components of a representative skin-tone pixel by the prescribed coefficients ($\alpha 2$, $\alpha 1$), respectively, and converting the values obtained to the chromaticity value falls on or in a zone near the skin-tone—blackbody locus H, this means that if the prescribed coefficients ($\alpha 2$, $\alpha 1$) are used, then the chromaticity value B ($r_1$,$b_1$) will fall within a zone near the gray—blackbody locus G corresponding to the provisional color temperature Th (which will be described next) obtained using the skin-tone—blackbody locus H also with regard to gray pixels. Gray pixels can be detected comparatively accurately utilizing this fact. That is, use is made of the following principle: if the skin-tone-area representative chromaticity value A ($r_0$,$b_0$) can be shifted (transformed) to the neighborhood of a point corresponding to the provisional color temperature Th of the photographic light source on the skin-tone—blackbody locus H, then a gray pixel can also be shifted (transformed) to the neighborhood of the gray—blackbody locus G corresponding to the same color temperature Th by the prescribed coefficients ($\alpha 2$, $\alpha 1$) used in making the above-mentioned shift.

If the distance between the coefficient-multiplied skin-tone-area representative chromaticity value B ($r_1$,$b_1$) and a point on the skin-tone—blackbody locus H nearest this value is equal to or greater than the prescribed value (e.g., 0.01), this means that gray pixels cannot be detected accurately even if the prescribed coefficients ($\alpha 2$, $\alpha 1$) are used. For this reason, prescribed coefficients ($\alpha 2$, $\alpha 1$) for which the coefficient-multiplied skin-tone-area representative chromaticity value B ($r_1$,$b_1$) will reside on or in an area near the skin-tone—blackbody locus H are sought.

Although the details will be described later, the prescribed coefficients ($\alpha 2$, $\alpha 1$) are changed to other values by the coefficient optimizing circuit 25. The prescribed coefficients ($\alpha 2$, $\alpha 1$) after they have been changed by the coefficient optimizing circuit 25 also are made values for which the distance L1 between the coefficient-multiplied skin-tone-area representative chromaticity value B ($r_1$,$b_1$) and a point on the skin-tone—blackbody locus H nearest this value will be smaller than the prescribed value (e.g., 0.01).

If the distance L1 between the coefficient-multiplied skin-tone-area representative chromaticity value B ($r_1$,$b_1$) and a point on the skin-tone—blackbody locus H nearest this value is less than the prescribed value (e.g. 0.01) ("YES" at step 54), then the color temperature corresponding to the point on the skin-tone—blackbody locus H is adopted as the provisional color temperature Th (step 56; FIG. 6). The chromaticity value b vs. color temperature T data regarding skin-tone—blackbody locus H stored in the memory 26 is used in calculating the color temperature Th.

When the provisional color temperature Th is decided, the R and G components among the RGB value regarding each of the plurality of pixels contained in the reduced image are multiplied by the prescribed coefficients ($\alpha 2$, $\alpha 1$), respectively (step 57) (the coefficient multiplying circuit 21 may be used to perform this multiplication). Values ($\underline{Rj}$, $\underline{Gj}$, $\underline{Bj}$) indicated in the following equation are calculated:

$$\underline{Rj} = \alpha 2 \cdot Rj$$

$$\underline{Gj} = \alpha 1 \cdot Gj$$

$$\underline{Bj} = Bj \qquad \text{Eq. (4)}$$

The variable j in Equation (4) represents each individual pixel constituting the reduced image.

The (Rj, Gj, Bj) of every pixel of the reduced image obtained by multiplication by the prescribed coefficients ($\alpha 2$, $\alpha 1$) is converted to a chromaticity value (step 58) (the chromaticity converting circuit 22 may be used in the conversion processing). This chromaticity value shall be referred to as a "coefficient-multiplied pixel chromaticity value (rj, bj)".

Next, a point (r value and b value) on the gray—blackbody locus G corresponding to a color temperature identical with the provisional color temperature Th that has been decided is calculated and, from among pixels constituting the reduced image, those pixels whose coefficient-multiplied pixel chromaticity values (rj, bj) reside within a range equivalent to color temperature Th±500K and whose distances from the gray—blackbody locus G reside within a range of 0.01 are decided upon as gray candidate pixels (step 59).

Figure 7:
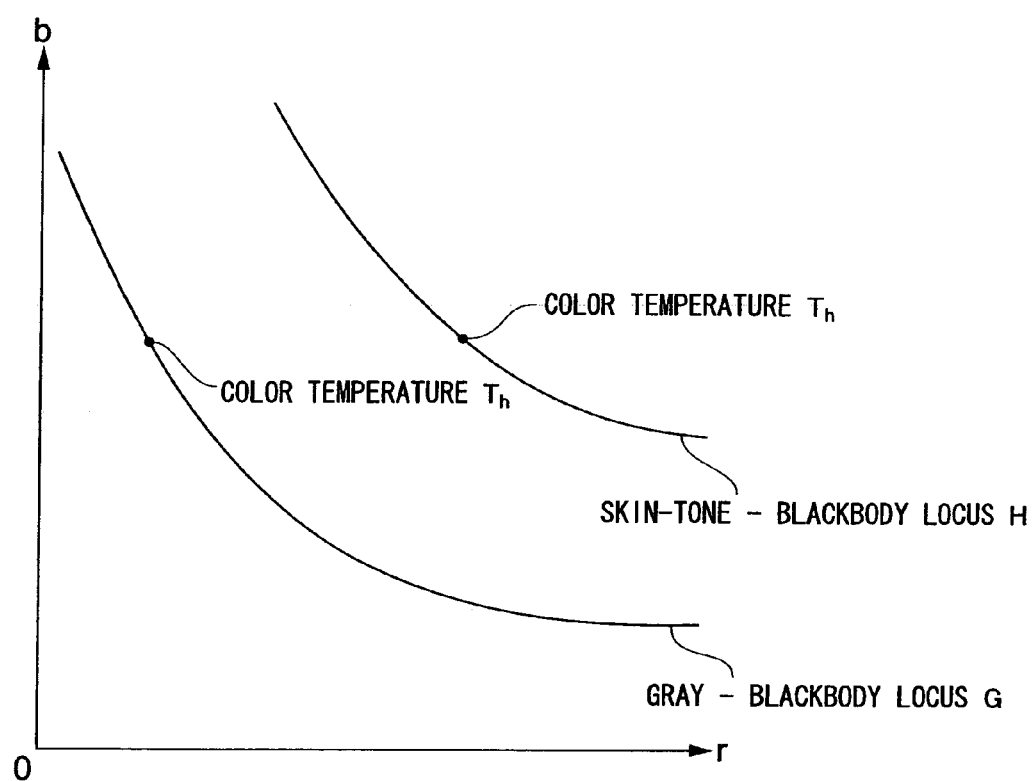
FIG. 7 illustrates a plotted point on the skin-tone—blackbody locus H corresponding to provisional color temperature, and plotted point on the gray—blackbody locus G corresponding to provisional color temperature.
Figure 8:
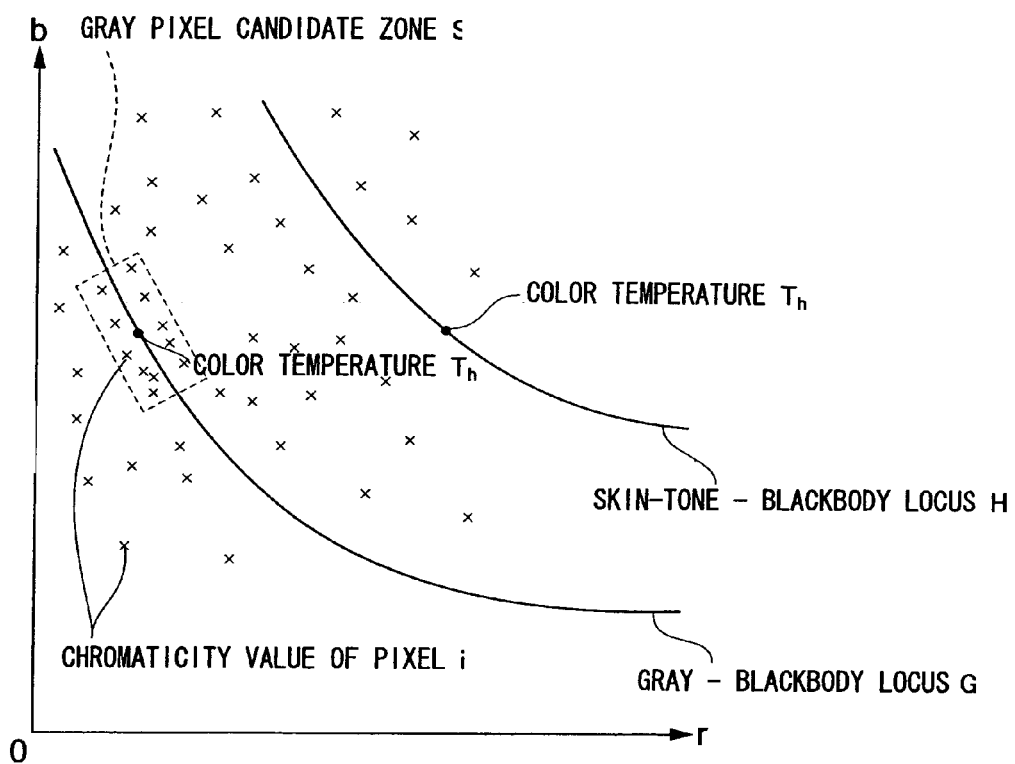
FIG. 8 illustrates a zone of gray candidate pixels.

FIG. 7 illustrates a point, which is on the gray—blackbody locus G, corresponding to color temperature Th and plotted on the chromaticity diagram. FIG. 8 illustrates the coefficient-multiplied pixel chromaticity values (rj, bj) plotted on the chromaticity diagram (the plotted points are indicated by the "×" symbols). In FIG. 8, a range that falls within the bounds of color temperature Th±500K and for which distance from the gray—blackbody locus G is 0.01 is indicated as being enclosed by dashed lines (this range shall be referred to as a "gray pixel candidate zone S" below). Pixels residing within the gray pixel candidate zone S are decided upon as gray candidate pixels.

The gray candidate pixels are decided depending upon whether the values (rj, bj), which are the result of multiplying the R and G components of the RGB values regarding each of the plurality of pixels contained in the reduced image by the prescribed coefficients ($\alpha 2$, $\alpha 1$), respectively, and converting the values obtained to chromaticity values, fall within the gray pixel candidate zone S. Pixels decided as gray candidate pixels signify pixels that fall within a zone near the gray—blackbody locus G when the R and G components of the RGB values regarding each of the plurality of pixels constituting the input image (the reduced image) are multiplied by the prescribed coefficients ($\alpha 2$, $\alpha 1$), respectively.

As will be described later, the finally decided color temperature of the light source is decided based upon the color temperatures of each of the pixels construed to be gray pixels in the gray candidate pixel detecting circuit 23. The greater the number of pixels decided upon as gray pixels in the gray candidate pixel detecting circuit 23, the higher the calculation accuracy of the finally decided color-source color temperature can be made. In order to raise the accuracy of the light-source color temperature that is finally decided, processing for finding prescribed coefficients ($\alpha 2$, $\alpha 1$) for which a number N of gray candidate pixels will be maximized is executed.

The pixel number calculating circuit 24 and coefficient optimizing circuit 25 are used in the processing to find the prescribed coefficients ($\alpha 2$, $\alpha 1$) that will maximize the number N of gray candidate pixels. First, the number N of gray candidate pixels, which have been detected by the gray candidate pixel detecting circuit 23, is calculated by the pixel number calculating circuit 24 (step 60).

The number N of gray candidate pixels calculated by the pixel number calculating circuit 24 is applied to the coefficient optimizing circuit 25.

The coefficient optimizing circuit 25 finds the prescribed coefficients ($\alpha 2$, $\alpha 1$) that maximize the number N of gray candidate pixels calculated by the pixel number calculating circuit 24, namely that maximize the number of pixels that will have chromaticity values that fall within the gray pixel candidate zone S. Based upon a method such as the simplex method, the coefficient optimizing circuit 25 decides the prescribed coefficients ($\alpha 2$, $\alpha 1$) for which the number N of gray candidate pixels will be maximized (these prescribed coefficients shall be referred to as "optimizing coefficients" below) ("NO" at step 61; step 62). It goes without saying that the coefficient multiplying circuit 21, chromaticity converting circuit 22, gray candidate pixel detecting circuit 23 and pixel number calculating circuit 24 operate a plurality of times in the course of execution of the processing for deciding the optimizing coefficients.

When the optimizing coefficients ($\alpha 2$, $\alpha 1$) for which the number N of gray candidate pixels is maximized are calculated ("YES" at step 61), the gray candidate pixels obtained using these optimizing coefficients ($\alpha 2$, $\alpha 1$) are decided upon as the final gray pixels. The addresses of these decided gray pixels are sent from the gray candidate pixel detecting circuit 23 to the color temperature calculating circuit 31 of the white balance correction coefficient calculating unit 30 (step 63).

(III) White Balance Correction Coefficient Calculating Unit 30

The white balance correction coefficient calculating unit 30 comprises the color temperature calculating circuit 31 and correction coefficient calculating circuit 32.

On the basis of the addresses of the plurality of gray pixels provided by the gray candidate pixel detecting circuit 23, the color temperature calculating circuit 31 calculates the color temperature tempT of each gray pixel having such an address based upon the gray—blackbody locus G (the chromaticity value b vs. color temperature T data regarding gray—blackbody locus G), and calculates an average value aveT of a plurality of color temperatures tempT of respective ones of the gray pixels. For example, if multiplication has been performed using the optimizing coefficients ($\alpha 2$, $\alpha 1$), then it will be construed that the color temperature tempT of each gray pixel is a color temperature that corresponds to a point on the gray—blackbody locus G nearest the plotted points of each of the gray pixels on the chromaticity diagram. The average value aveT calculated by the color temperature calculating circuit 31 is decided (estimated) as the color temperature of the light source regarding the reduced image.

As mentioned above, the provisional color temperature Th is obtained previously using the skin-tone —blackbody locus H. However, this provisional color temperature Th is not employed as the color temperature of the light source. The reason for this is that since what is to be finally obtained is a white balance (color balance) correction coefficient, it is believed that the average value aveT obtained using the gray pixels is better for obtaining a more accurate light-source color temperature.

The color temperature aveT of the light source calculated by the color temperature calculating circuit 31 is applied to the correction coefficient calculating circuit 32.

The correction coefficient calculating circuit 32 calculates coefficients (white balance correction coefficients) used to multiply each of the RGB values of every pixel that constitutes the reduced image. The correction coefficient calculating circuit 32 executes the following processing (A) to (C):

(A) A chromaticity value on the gray—blackbody locus G corresponding to the color temperature aveT is calculated based upon the color temperature aveT and the chromaticity value b vs. color temperature T data regarding gray—blackbody locus G. A chromaticity value on the gray—blackbody locus G corresponding to the color temperature aveT shall be represented by ($r_{ave}$, $b_{ave}$).

(B) A target r value and target b value regarding a gray pixel is denoted ($r_{target}$, $b_{target}$) (set values) (In a manner of speaking, the tint of the gray pixel is set in advance.) Target-difference correction coefficients ($\beta 1$, $\beta 2$, $\beta 3$) for respective ones of the R, G and B components are calculated according to the following equations:

$$\beta 1 = r_{target}/r_{ave}$$

$$\beta 2 = (1 - r_{target} - b_{target})/(1 - r_{ave} - b_{ave})$$

$$\beta 3 = b_{target}/b_{ave} \quad \text{Eq. (5)}$$

The calculated $\beta 1$, $\beta 2$, $\beta 3$ are values that make the tint of a detected gray pixel the set tint (that make the tint of a detected gray pixel approach the set tint).

The relationship between RGB values ($R_{input}$, $G_{input}$, $B_{input}$) of each pixel that constitutes the input image (the reduced image) and RGB values ($R_{output}$, $G_{output}$, $B_{output}$) of each pixel that constitutes the output image after the application of the white balance correction is represented by the following equations using the optimizing coefficients ($\alpha 2$, $\alpha 1$) and the target-difference correction coefficients ($\beta 1$, $\beta 2$, $\beta 3$):

$$R_{output} = \alpha 2 \cdot \beta 1 \cdot R_{input}$$

$$G_{output} = \alpha 1 \cdot \beta 2 \cdot G_{input}$$

$$B_{output} = \beta 3 \cdot B_{input} \quad \text{Eq. (6)}$$

(C) In accordance with Equations (6), the brightness of the image fluctuates greatly and therefore Equations (6) are normalized as Equations (7) in such a manner that the brightness of e.g., the G component will not be changed.

$$R_{output} = (\alpha 2 \cdot \beta 1)/(\alpha 1 \cdot \beta 2) \cdot R_{input}$$

$$G_{output} = G_{input}$$

$$B_{output} = \beta 3)/(\alpha 1 \cdot \beta 2) \cdot B_{input} \quad \text{Eq. (7)}$$

Correction processing in accordance with Equations (7) expresses gray pixels by a gray tint (expressed by multiplication by $\alpha 2$, $\alpha 1$) and expresses other colors by the set tint (expressed by multiplication by $\beta 1$, $\beta 2$, $\beta 3$). The white balance correction is implemented by Equations (7).

The correction coefficient calculating circuit 32 applies the correction coefficients [($\alpha 2 \cdot \beta 1$)/($\alpha 1 \cdot \beta 2$), 1, $\beta 3$/($\alpha 1 \cdot \beta 2$)] regarding respective ones of the R, B, G components to the white balance correcting circuit 42 of the white balance correcting unit 40.

(IV) White Balance Correcting Unit 40

The white balance correcting unit 40 comprises the reduced-image generating circuit 41, white balance correcting circuit 42 and enlarged-image generating circuit 43.

The image data that has been read out of the storage device 4 (image data identical with the image data applied to the reduced-image generating circuit 11) is input to the reduced-image generating circuit 41. If the size of the input image is larger than the image size (a prescribed size) to be read out, the reduced-image generating circuit 41 reduces the size of the input image. If the input image size is the same as the prescribed size, or if it is smaller than the prescribed size, the reduced-image generating circuit 41 executes no particular processing.

The correction coefficients [($\alpha 2 \cdot \beta 1$)/($\alpha 1 \cdot \beta 2$), 1, $\beta 3$/(($\alpha 1 \cdot \beta 2$)] that have been calculated in the correction coefficient calculating circuit 32 are applied to the white balance correcting circuit 42. The latter subjects the RGB values of every pixel constituting the reduced image to a correction (white balance correction) using these correction coefficients. The reduced-image data that has undergone the white balance correction is input to the enlarged-image generating circuit 43. If the size of the input image is less than the prescribed size, the enlarged-image generating circuit 43 executes enlargement processing to make the white-balance-corrected image data agree with the prescribed size. If the input image size is the same as the prescribed size, or if it is greater than the prescribed size, the enlarged-image generating circuit 43 executes no particular processing.

The white balance correction (color balance correction) of the input image is implemented by the correction coefficients [($\alpha 2 \cdot \beta 1$)/($\alpha 1 \cdot \beta 2$), 1, $\beta 3$) /($\alpha 1 \cdot \beta 2$)] regarding respective ones of the R, B, G components used in the white balance correction. Thus image data that has undergone the white balance correction can be obtained.

If the result of subjecting a representative skin-tone pixel to the white balance correction using the calculated white balance coefficients [($\alpha 2 \cdot \beta 1$)/($\alpha 1 \cdot \beta 2$), 1, $\beta 3$)/($\alpha 1 \cdot \beta 2$)] does not fall within the range of colors adopted as a reference (e.g., a case where a detected gray pixel is erroneous is conceivable), it is preferred that the correction be weakened.

Figure 9:
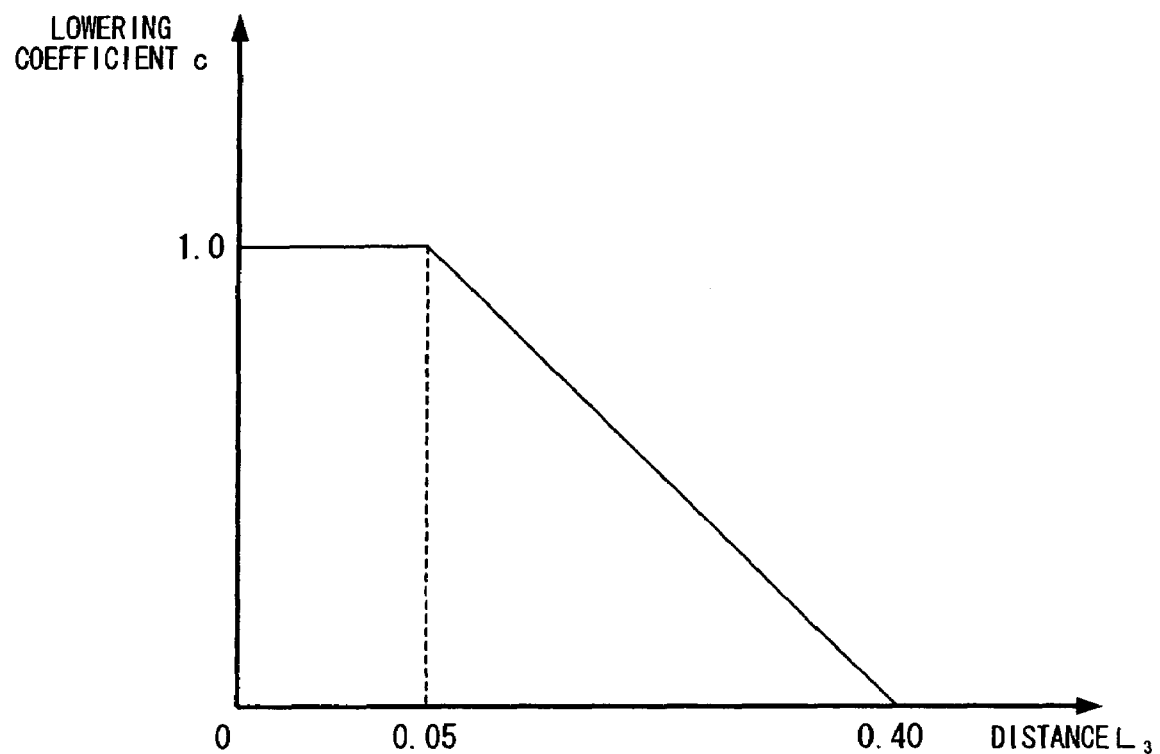
FIG. 9 illustrates the relationship between a lowering coefficient c and distance $L_3$ between a skin-tone-area representative chromaticity value, which has undergone a white balance correction, and a reference skin-tone chromaticity value.

For example, a distance $L_3$ between a chromaticity value of a representative skin-tone pixel in image data after application of the white balance correction and a reference skin-tone chromaticity value ($r_2, b_2$) is calculated and then a lowering coefficient c is calculated based upon the distance $L_3$ calculated. FIG. 9 illustrates a graph (look-up table) indicating the relationship between the calculated distance $L_3$ and the lowering coefficient c ($0 \leq c \leq 1$). White balance correction coefficients (gain r, gain g, gain b) regarding respective ones of the R, G, B components, which coefficients have had their correction effect weakened using the lowering coefficient c, are represented by the following equations:

$$\text{gain } r = \left(\frac{\alpha_2 \cdot \beta_2}{\alpha_1 \cdot \beta_2}\right)^c$$

$$\text{gain } g = 1$$

$$\text{gain } b = \left(\frac{\beta_3}{\alpha_1 \cdot \beta_2}\right)^c \quad \text{Eq. (8)}$$

Figure 10:
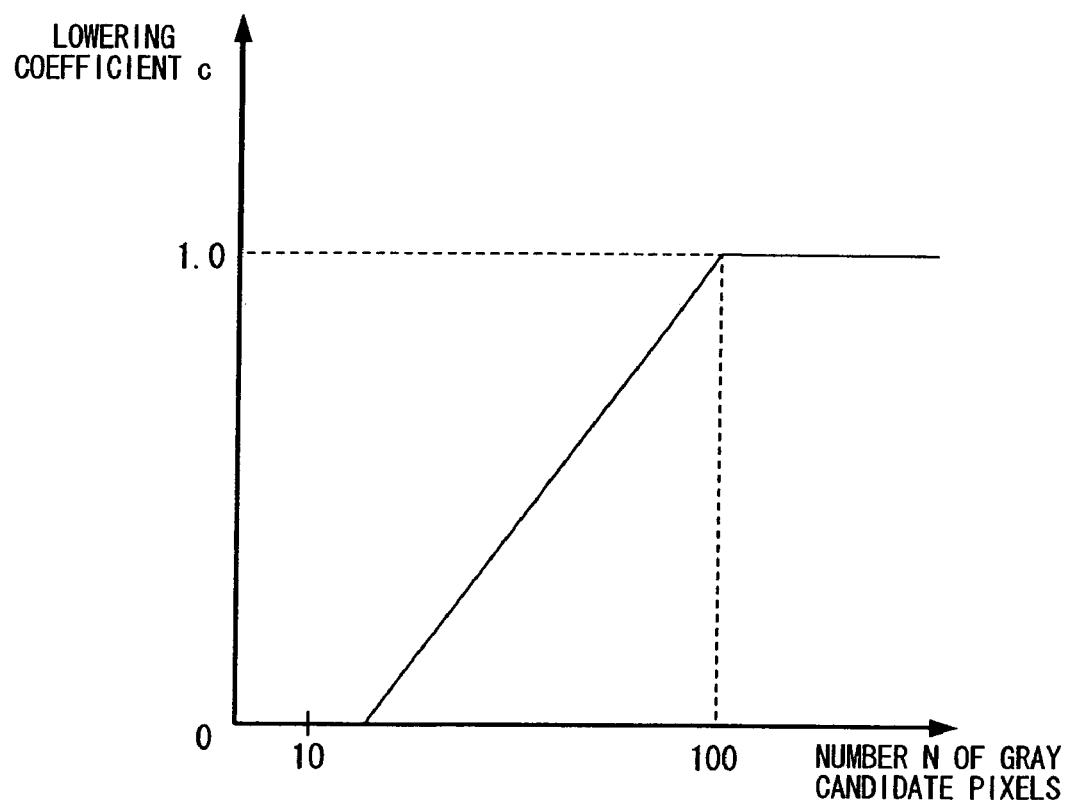
FIG. 10 illustrates the relationship between a number N of gray candidate pixels and the lowering coefficient c.

Furthermore, there is a possibility that an erroneous gray pixel will be detected also in a case where the decided value of the number N of gray candidate pixels is small. In this case also it will suffice to weaken the effect of the white balance correction using the lowering coefficient c ($0 \leq c \leq 1$). FIG. 10 is a graph (look-up table) representing the relationship between the number N of gray candidate pixels and the lowering coefficient c.

The two lowering coefficients c may be used conjointly. In such case use would be made of coefficients obtained by multiplication by the two lowering coefficients c.

Modification 1

Figure 11:
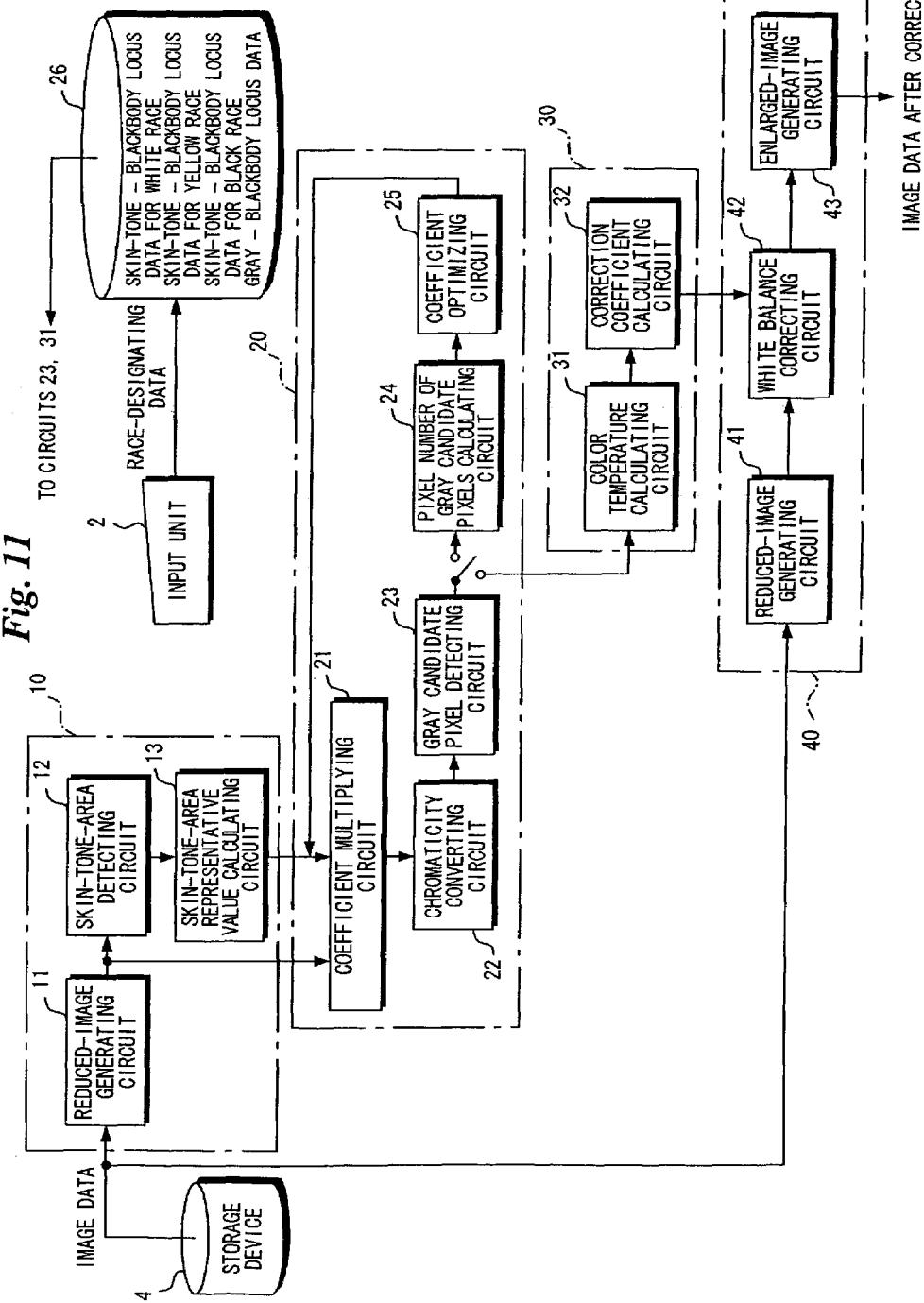
FIG. 11 is a block diagram illustrating the electrical structure of a modification of the image correction apparatus.

FIG. 11 is a block diagram illustrating a modification of the image correction apparatus 1. This block diagram of the image correction apparatus 1 differs from that of the image correction apparatus 1 of FIG. 3 in that a plurality of types of skin-tone—blackbody locus data have been stored in the memory 26, and in that the skin-tone—blackbody locus data that is to be read out of the memory 26 is designated based upon race-specifying data supplied from the input unit 2.

Figure 12:
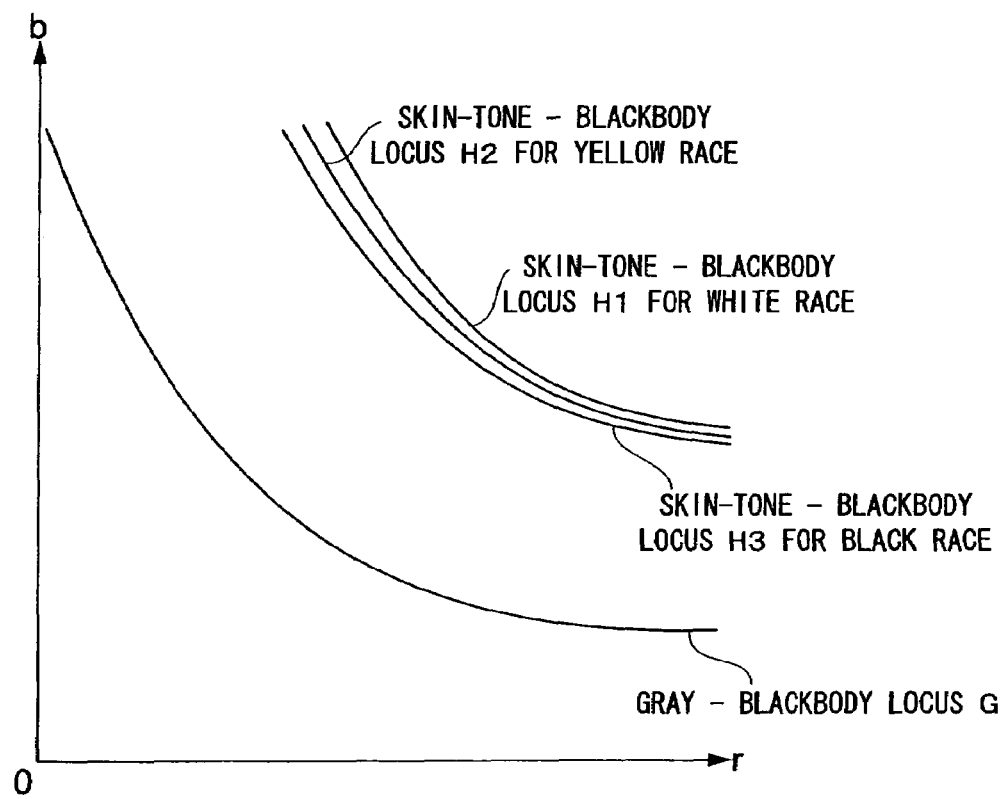
FIG. 12 illustrates the relationship between a gray—blackbody locus and skin-tone—blackbody loci for individuals of white, yellow and black races, these being indicated on a chromaticity diagram.

In the modification illustrated in FIG. 11, three types of skin-tone—blackbody locus data, namely skin-tone —blackbody locus data for persons of the white race, skin-tone—blackbody locus data for persons of the yellow race and skin-tone—blackbody locus data for persons of the black race, have been stored in the memory 26. FIG. 12 illustrates a skin-tone—blackbody locus H1 for white persons described by the skin-tone—blackbody locus data for white persons, a skin-tone—blackbody locus H2 for yellow persons described by the skin-tone—blackbody locus data for yellow persons, and a skin-tone—blackbody locus H3 for black persons described by the skin-tone—blackbody locus data for black persons, these being shown on a chromaticity diagram together with the gray—blackbody locus G.

As mentioned above, human skin is such that the RGB values themselves differ depending upon race. If the chromaticity values are found, however, the values will be close. Accordingly; by using the data of one skin-tone—blackbody locus (see FIGS. 5 to 8), gray pixels can be detected comparatively accurately and a comparatively accurate light-source color temperature can be calculated. In order to further enhance the accuracy of gray-pixel detection and the accuracy of estimation of light-source color temperature with the modification shown in FIG. 11, estimation of light-source color temperature and processing for calculating gray pixels are carried out using skin-tone—blackbody locus data that conforms to the race of the person present in the image represented by the image data to be processed.

The race (white, yellow or black) (Caucasoid, Mongoloid or Negroid) of a person present in an image represented by image data to be processed is designated by the user (operator) of the digital photo printing system using the input unit 2. The skin-tone—blackbody locus data (skin-tone—blackbody locus data for white persons, skin-tone—blackbody locus data for yellow persons or skin-tone—blackbody locus data for black persons) corresponding to the race designated is read out of the memory 26 and used in processing executed by the gray candidate pixel detecting circuit 23. Since gray pixels are detected and light-source color temperature calculated-on a per-race basis using skin-tone—blackbody locus data suited to the race, gray pixels can be detected accurately and light-source color temperature can be calculated. The white balance correction can be executed more appropriately.

It should be noted that in a case where a plurality of persons of different races are present in an image represented by image data to be processed, it may be so arranged that white balance correction coefficients are calculated for every face image (every race) and the white balance correction performed using the average value of these coefficients.

Modification 2

Figure 13:
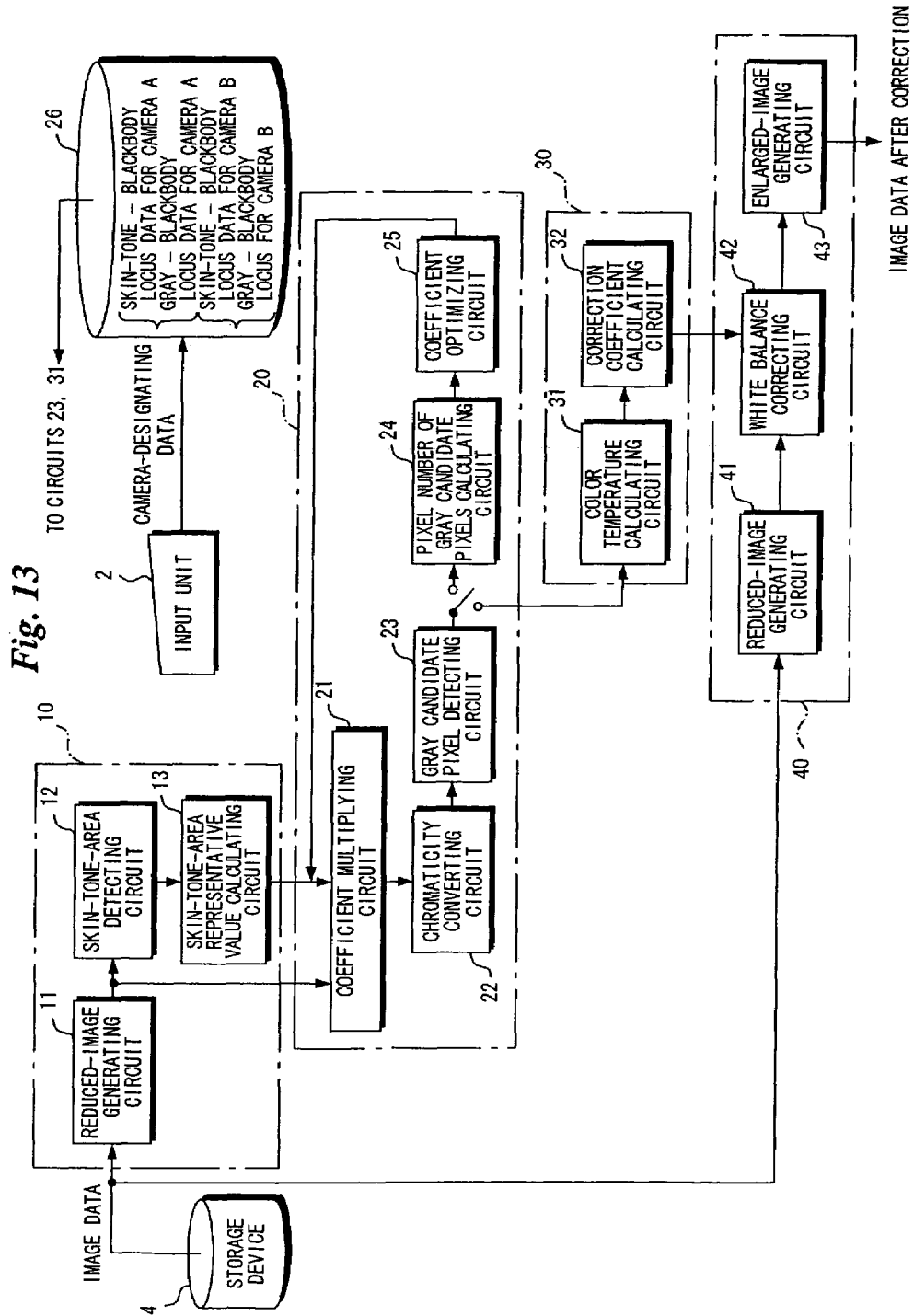
FIG. 13 is a block diagram illustrating the electrical structure of a modification of the image correction apparatus.

FIG. 13 is a block diagram illustrating another modification of the image correction apparatus 1. This block diagram of the image correction apparatus 1 differs from that of the image correction apparatus 1 of FIG. 3 in that a plurality of sets of skin-tone—blackbody locus data and gray—blackbody locus data have been stored in the memory 26, and in that skin-tone —blackbody locus data and gray—blackbody locus data to be read out of the memory 26 is designated based upon data for specifying camera model supplied from the input unit 2.

Figure 14:
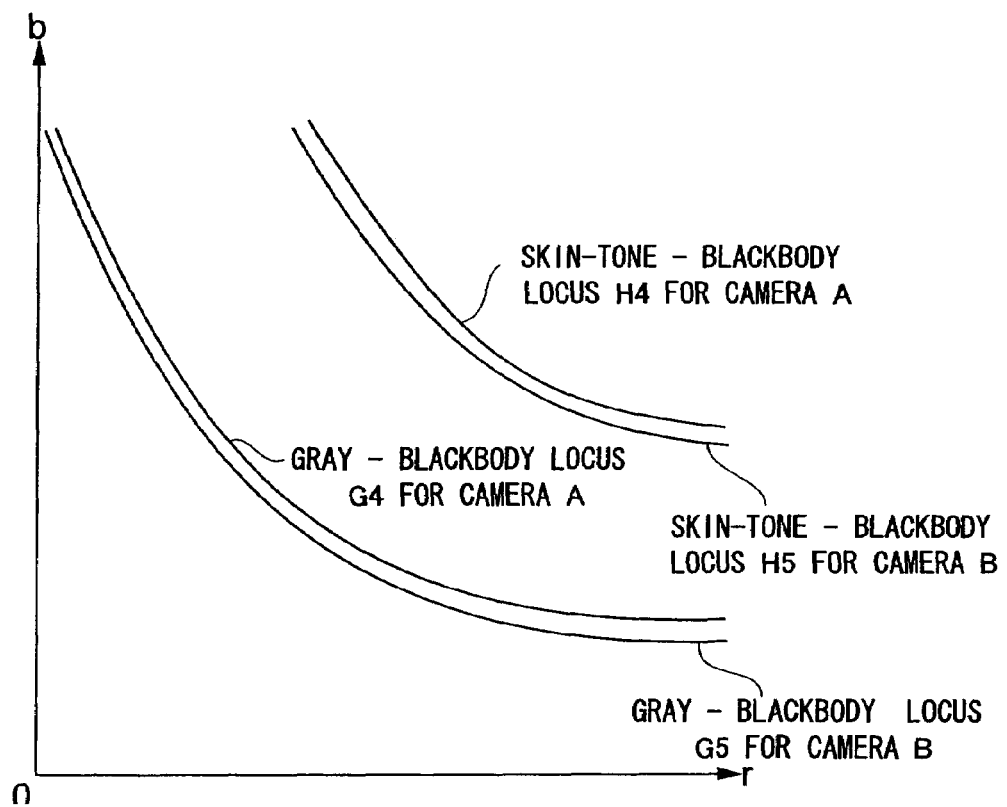
FIG. 14 illustrates a skin-tone—blackbody locus and gray—blackbody locus for a camera A and a skin-tone —blackbody locus and gray—blackbody locus for a camera B on a chromaticity diagram.

In the modification illustrated in FIG. 13, skin-tone —blackbody locus data and gray—blackbody locus data for camera A and skin-tone—blackbody locus data and gray—blackbody locus data for camera B has been stored in the memory 26. FIG. 14 illustrates a skin-tone —blackbody locus H4 and a gray—blackbody locus G4 that are described by the skin-tone—blackbody locus data and gray—blackbody locus for camera A, respectively, as well as a skin-tone—blackbody locus H5 and a gray—blackbody locus G5 that are described by the skin-tone—blackbody locus data and gray—blackbody locus for camera B, respectively, these being shown on a chromaticity diagram.

As mentioned above, the blackbody locus describes a locus that differs depending upon the spectral sensitivity distribution $Si(\lambda)$ of the CCD sensor in a digital camera or the like [see Equation (1)]. With the image correction apparatus 1 shown in FIG. 13, blackbody locus (skin-tone—blackbody locus and gray—blackbody locus) corresponding to a CCD sensor provided in a digital camera used in acquiring image data to be processed are used in detecting gray pixels and in calculating light-source color temperature.

The model of digital camera that was used in creating image data to be processed is designated by the user (operator) of the digital photo printing system using the input unit 2. The skin-tone—blackbody locus data and gray—blackbody locus data corresponding to the camera model designated is read out of the memory 26 and used in processing executed by the gray candidate pixel detecting circuit 23 and by the color temperature calculating circuit 31. Since gray pixels are detected and light-source color temperature calculated using skin-tone—blackbody locus data and gray—blackbody locus data suited to the camera model (the type of CCD sensor) that was employed in creating the image data to be processed, the accuracy of gray-pixel detection and the accuracy at which light-source color temperature is calculated can be enhanced.

In Modification 2 described above, the user (operator) designates the camera model using the input unit 2. However, it may be so arranged that if the image data to be processed possesses tag information (e.g., an Exif tag) that includes information specifying the camera model, the camera model that was used to acquire the image data to be processed is specified automatically based upon the tag information and the skin-tone—blackbody locus data and gray—blackbody locus data corresponding to the specified camera model is read out of the memory 26. In this case, it is not necessarily required that the camera model be designated using the input unit 2.

Second Embodiment

Figure 15:
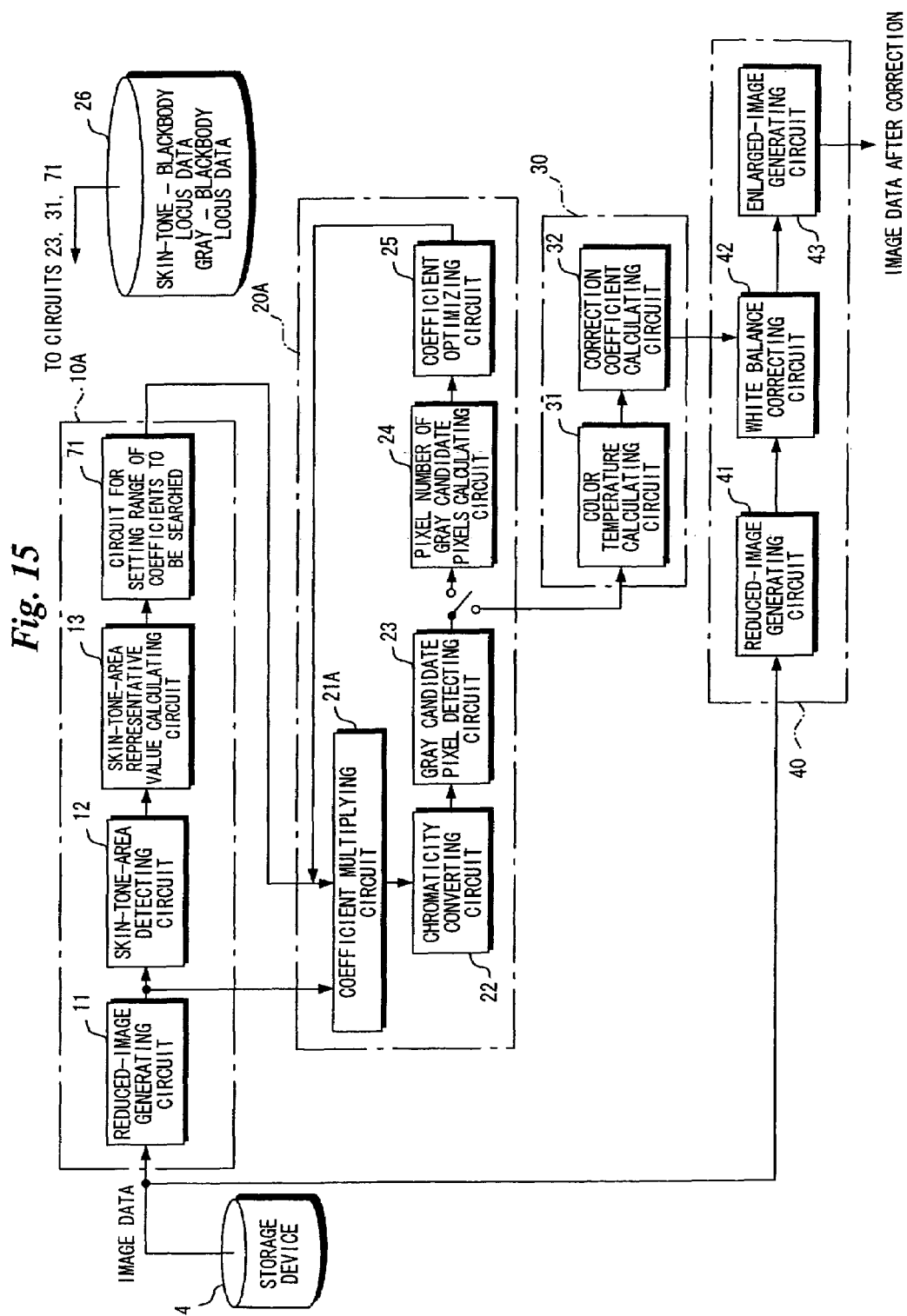
FIG. 15 is a block diagram illustrating the electrical structure of an image correction apparatus according to a second embodiment of the present invention.

FIG. 15 is a block diagram illustrating the electrical structure of an image correction apparatus 1A, together with the storage device 4, according to a second embodiment of the present invention. The structure of a skin-tone-area representative value calculating unit 10A and the processing by a gray pixel detector 20A differ from those of the image correction apparatus 1 of the first embodiment shown in FIG. 3, as will be described next. Circuits in FIG. 15 identical with those included in the image correction apparatus 1 shown in FIG. 3 are designated by like reference characters and need not be described again.

The skin-tone-area representative value calculating unit 10A in the image correction apparatus 1A comprises the reduced-image generating circuit 11, skin-tone-area detecting circuit 12, the circuit 13 that calculates the skin-tone-area representative values and a circuit 71 for setting a range of coefficients to be searched. In a manner similar to that of the representative value calculating unit 10 of the first embodiment, the skin-tone-area representative value calculating unit 10A detects a skin-tone area contained in image data to be processed read out of the storage device 4 (this is the processing by the skin-tone-area detecting circuit 12) and calculates a representative value obtained from the skin-tone area detected (this is the processing by the circuit 13 that calculates the skin-tone-area representative values). Furthermore, a range of values to be taken on by the prescribed coefficients ($\alpha 2$, $\alpha 1$) is set in the skin-tone-area representative value calculating unit 10A of image correction apparatus 1A based upon the calculated skin-tone-area representative value and skin-tone—blackbody locus.

Figure 16:
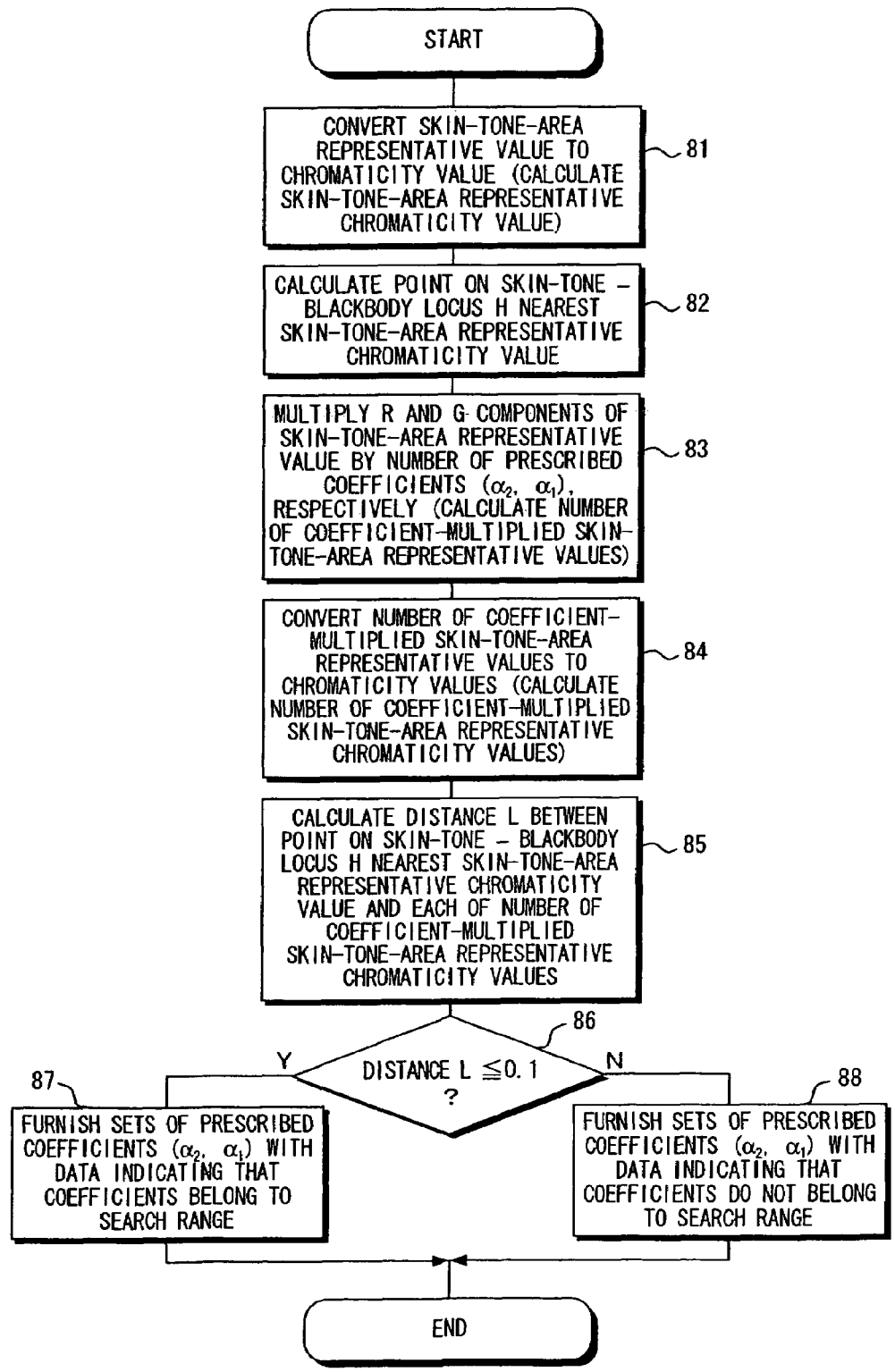
FIG. 16 is a flowchart illustrating the flow of processing for setting a range of coefficients to be searched.
Figure 17:
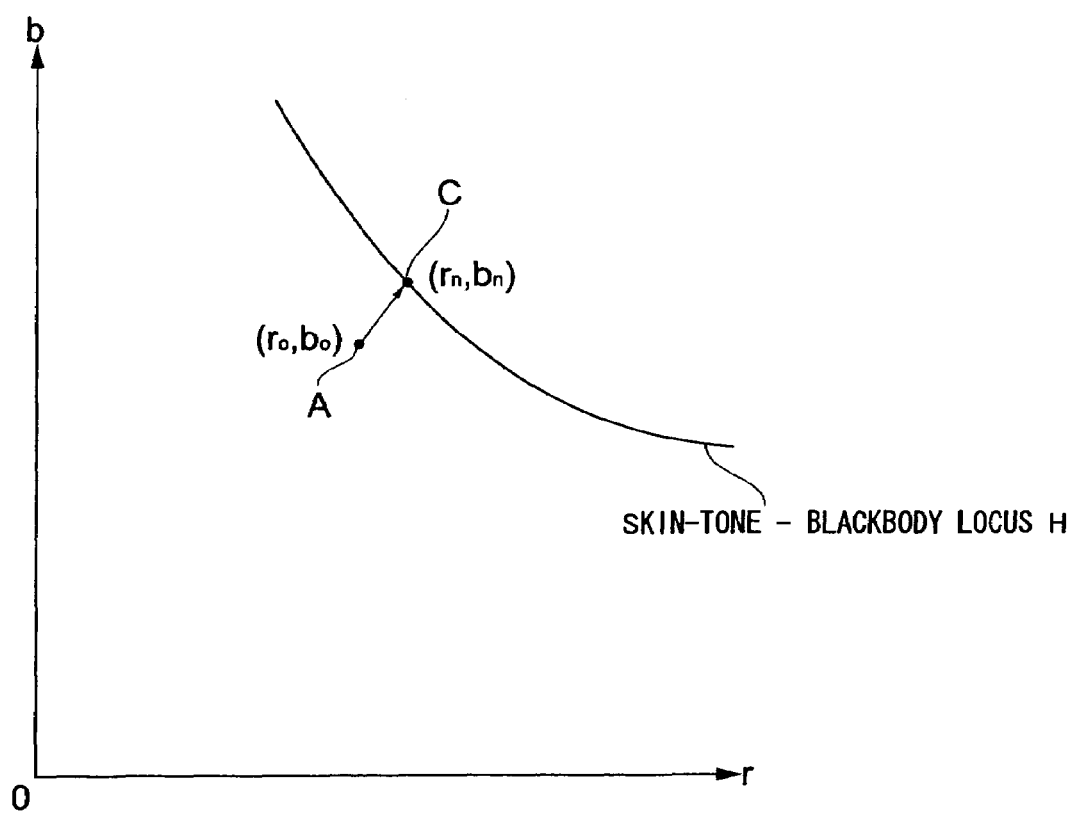
FIG. 17 illustrates a skin-tone—blackbody locus H, a plotted point A of a skin-tone-area representative chromaticity value and a plotted point C on the skin-tone —blackbody locus H nearest the plotted point A, these being indicated on a chromaticity diagram.

FIG. 16 is a flowchart illustrating the flow of processing executed by the circuit 71 for setting a range of coefficients to be searched. The processing executed by the circuit 71 will be described with reference also to the chromaticity diagrams of FIGS. 17 and 18.

A chromaticity value is calculated from the skin-tone-area representative value (tfR, tfG, tfB) that has been calculated by the circuit 13 that calculates skin-tone-area representative values (step 81). The skin-tone-area representative chromaticity value $(r_0, b_0)$ is obtained.

Next, a point (r value, b value) on the skin-tone —blackbody locus H nearest the calculated skin-tone-area representative chromaticity value $(r_0, b_0)$ is calculated (step 82). The point on the skin-tone—blackbody locus H nearest the calculated skin-tone-area representative chromaticity value $(r_0, b_0)$ is made $(r_n, b_n)$. On the chromaticity diagram shown in FIG. 17, a plotted point A indicates the skin-tone-area representative chromaticity value $(r_0, b_0)$, and a plotted point C indicates the point $(r_n, b_n)$ on the skin-tone—blackbody locus H nearest the skin-tone-area representative chromaticity value A $(r_0, b_0)$.

The R and G components of the skin-tone-area representative value (tfR, tfG, tfB) are multiplied by a number of prescribed coefficients ($\alpha 2$, $\alpha 1$), respectively [step 83; see Equation (3)]. The prescribed coefficients ($\alpha 2$, $\alpha 1$) are a number of sets of numerical values in which the numerical values are changed with regard to each of $\alpha 2$ and $\alpha 1$ over a range of 0.5 to 2.0 in increments on the order of 0.01. In other words, a multiplicity of skin-tone-area representative values (tfR, tfG, tfB) are calculated.

The number of skin-tone-area representative values (tfR, tfG, tfB) calculated are converted to chromaticity values (step 84). A number of coefficient-multiplied skin-tone-area representative chromaticity values $(r_1, b_1)$ are calculated.

Figure 18:
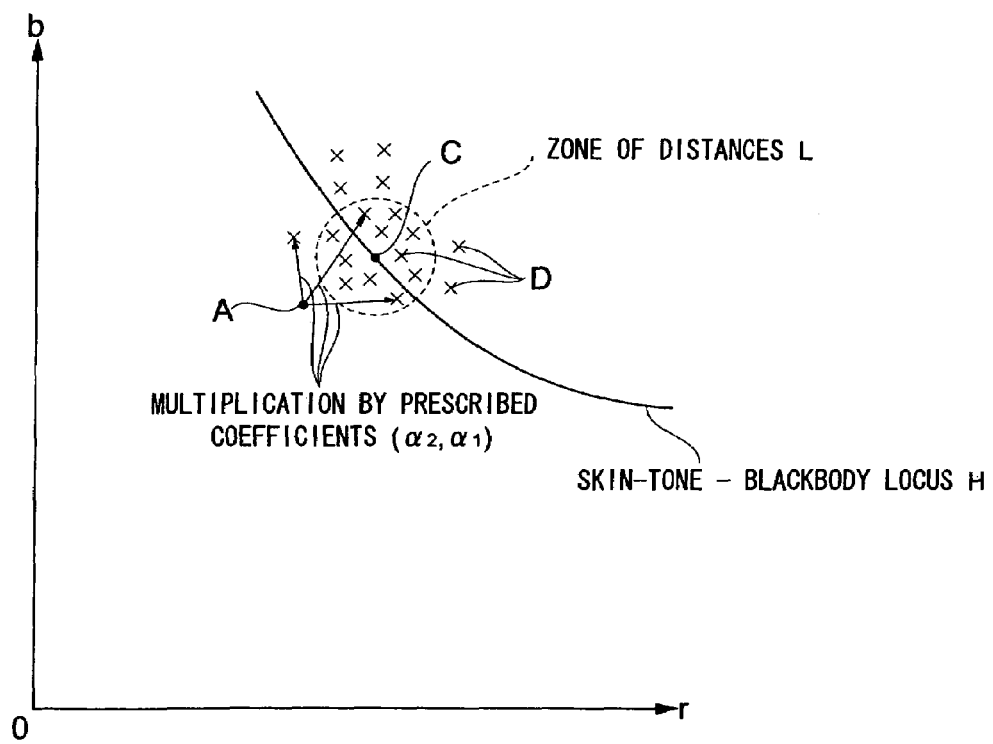
FIG. 18 illustrates a zone of prescribed distances from a plotted point C, and plotted points D of skin-tone-area representative chromaticity values obtained by coefficient multiplication.

In the chromaticity diagram shown in FIG. 18, plotted points D (indicated by the "×" symbols) indicate the number of coefficient-multiplied skin-tone-area representative chromaticity values $(r_1, b_1)$ calculated.

The distance L between the point C $(r_n, b_n)$ on the skin-tone—blackbody locus H nearest the skin-tone-area representative chromaticity value A $(r_0, b_0)$ and each of the number of coefficient-multiplied skin-tone-area representative chromaticity values D $(r_1, b_1)$ is calculated in accordance with the following equation (step 85):

$$L = \sqrt{(r_n - r_1)^2 + (b_n - b_1)^2}$$ Eq. (9)

If the distance L between the point C $(r_n, b_n)$ on the skin-tone—blackbody locus H nearest the skin-tone-area representative chromaticity value A $(r_0, b_0)$ and a coefficient-multiplied skin-tone-area representative chromaticity value D $(r_1, b_1)$ is equal to or less than 0.1 ("YES" at step 86), then it is judged that the prescribed coefficients ($\alpha 2$, $\alpha 1$) that were used in calculating this coefficient-multiplied skin-tone-area representative chromaticity value D $(r_1, b_1)$ are within the search range. In other words, it is judged that the prescribed coefficients ($\alpha 2$, $\alpha 1$) that were used in calculating the coefficient-multiplied skin-tone-area representative chromaticity value D $(r_1, b_1)$ plotted in the zone enclosed by the dashed line (the zone within the distance L from the plotted point C) are within the search range.

On the other hand, if the distance L between the point C $(r_n, b_n)$ on the skin-tone—blackbody locus H and a coefficient-multiplied skin-tone-area representative chromaticity value D $(r_1, b_1)$ is greater than 0.1 ("NO" at step 86), then it is judged that the prescribed coefficients ($\alpha 2$, $\alpha 1$) that were used in calculating this coefficient-multiplied skin-tone-area representative chromaticity value D $(r_1, b_1)$ are not within the search range. It is thus determined, with regard to all prescribed coefficients ($\alpha 2$, $\alpha 1$), whether these prescribed coefficients are or are not within the search range. Data (an identifying code) identifying whether the prescribed coefficients are those within the search range or those not within the search range is appended to all of the prescribed coefficients ($\alpha 2$, $\alpha 1$) (steps 87, 88).

Since a skin-tone representative pixel is an appropriate skin-tone pixel obtained from a face-image portion of a human being contained in an input image, the skin-tone-area representative chromaticity value A $(r_0, b_0)$ obtained from the representative skin-tone pixel will fall on or in a zone near the skin-tone—blackbody locus H if the white balance of the input image is appropriate. If the white balance of the input image is not appropriate, then the skin-tone-area representative chromaticity value A $(r_0, b_0)$ obtained from the representative skin-tone pixel will not lie on or in a zone near the skin-tone—blackbody locus H.

The prescribed coefficients ($\alpha 2$, $\alpha 1$) that belong to the search range are those prescribed coefficients that will cause the coefficient-multiplied skin-tone-area representative chromaticity value D $(r_1, b_1)$ to fall within the prescribed distance L centered on the point C $(r_n, b_n)$ on the skin-tone—blackbody locus H nearest the skin-tone-area representative chromaticity value A $(r_0, b_0)$ In other words, the prescribed coefficients ($\alpha 2$, $\alpha 1$) that belong to the search range are prescribed coefficients whereby the skin-tone-area representative chromaticity value A $(r_0, b_0)$ can be converted to the point C $(r_n, b_n)$ on the skin-tone—blackbody locus H or to a point near the point C. It can be construed, therefore, that these coefficients are candidates for applying a correction to obtain an appropriate white balance for an input image whose white balance was inappropriate originally.

Further, a skin-tone—blackbody locus H and gray—blackbody locus G are created assuming that the light source is of a type (e.g., sunlight) suited to measurement of blackbody radiation. However, if the input image to be processed is composed of image data that was obtained by taking a picture under a light source of a type not suited to measurement of blackbody radiation, e.g., under light from a fluorescent lamp, the processing for detecting gray pixels utilizing the skin-tone—blackbody locus H and gray—blackbody locus G will result in diminished detection accuracy in comparison with image data obtained under a light source of a type suited to measurement of blackbody radiation.

However, the prescribed coefficients ($\alpha 2$, $\alpha 1$) that belong to the above-mentioned search range are found by detecting the face-image portion of a human being contained in the input image and then using the skin-tone-area representative chromaticity value A $(r_0, b_0)$ obtained from the representative skin-tone pixels of the face-image portion detected. Even if the photographic light source is of a type not suited to measurement of blackbody radiation, it may be construed that the skin-tone-area representative chromaticity value A $(r_0, b_0)$ will fall on or near the skin-tone—blackbody locus H, which is created on the assumption that the light source is of a type (e.g., sunlight) suited to measurement of blackbody radiation, so long as the white balance of the input image is appropriate. The prescribed coefficients ($\alpha 2$, $\alpha 1$) belonging to the above-mentioned search range found by detecting the face-image portion of a human being contained in the input image and then using the skin-tone-area representative chromaticity value A $(r_0, b_0)$ obtained from the representative skin-tone pixels of the face-image portion detected are those prescribed coefficients that define a range of coefficients that will not much diminish the accuracy of processing for detecting gray pixels using the skin-tone—blackbody locus H and gray—blackbody locus G even if the photographic light source is of a type not suited to measurement of blackbody radiation.

As will be described later, the prescribed coefficients finally decided are decided from among the prescribed coefficients ($\alpha 2$, $\alpha 1$) of the search range. Gray pixels contained in the input image are detected based upon the finally decided prescribed coefficients, and the color temperature of the photographic light source is estimated (decided) based upon the gray pixels detected. Deciding the search range of prescribed coefficients is equivalent to deciding a range of color temperatures of the photographic light source.

Figure 19:
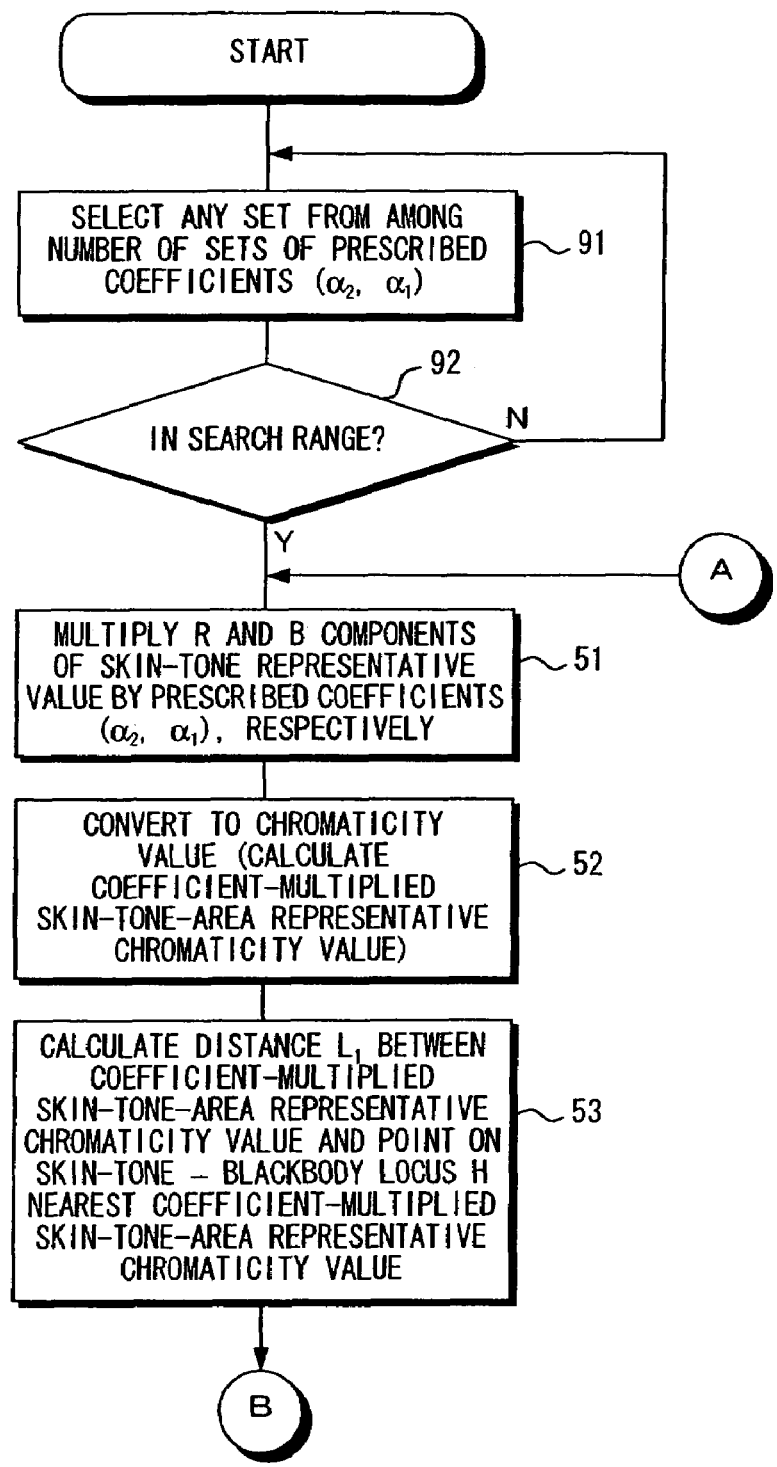
FIG. 19 is a flowchart illustrating the flow of processing executed by a gray pixel detector.
Figure 20:
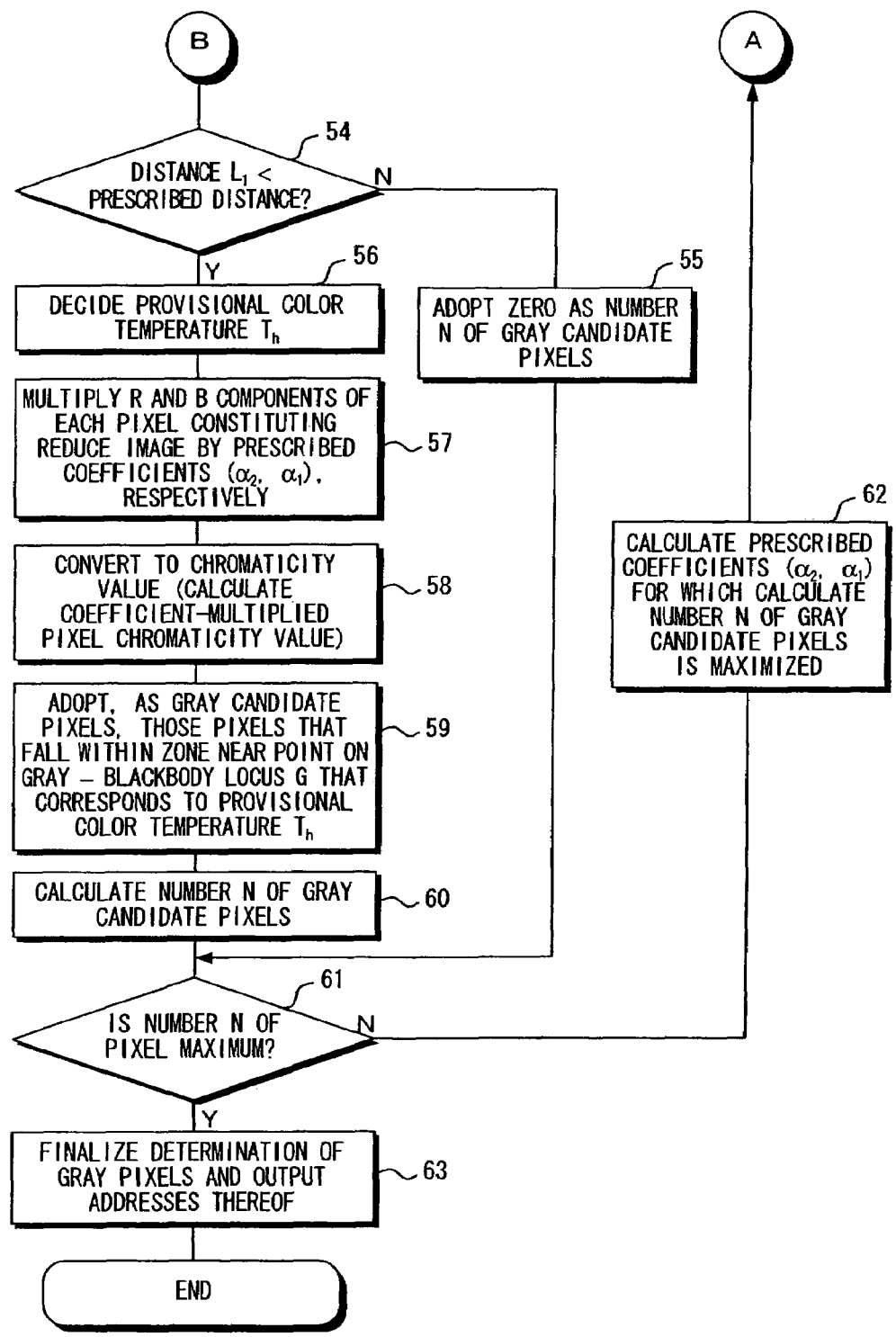
FIG. 20 is a flowchart illustrating the flow of processing executed by a gray pixel detector.

FIGS. 19 and 20 are flowcharts illustrating the flow of processing executed by the gray pixel detector 20A. This flowchart differs from that illustrating the flow of processing in the gray pixel detector 20 according to the first embodiment of FIG. 4 in that it includes additional processing (steps 91 and 92) using the above-mentioned search range of prescribed coefficients. Processing steps identical with those of the flowchart shown in FIG. 4 are designated by like step numbers and need not be described again.

The inputs to the coefficient multiplying circuit 21A are the skin-tone-area representative value (tfR, tfG, tfB) obtained by the circuit 13 that calculates skin-tone-area representative values, the reduced image data generated in the reduced-image generating circuit 11 (the RGB values regarding each of the plurality of pixels constituting the reduced image) and a number of prescribed coefficients ($\alpha 2$, $\alpha 1$) to which have been appended data identifying them as coefficients that are or are not in the search range.

The coefficient multiplying circuit 21A selects one of the number of prescribed coefficients ($\alpha 2$, $\alpha 1$) provided by the circuit 71 for setting the range of coefficients to be searched (step 91). As set forth above, each of the number of prescribed coefficients ($\alpha 2$, $\alpha 1$) is accompanied by data indicating whether the coefficients are or are not in the search range. If the prescribed coefficients ($\alpha 2$, $\alpha 1$) selected are not in the search range ("NO" at step 92), then other prescribed coefficients ($\alpha 2$, $\alpha 1$) are selected (step 91) [this means that the prescribed coefficients ($\alpha 2$, $\alpha 1$) that are not in the search range are judged to be ill suited to detection of gray candidate pixels].

If the selected prescribed coefficients ($\alpha 2$, $\alpha 1$) are in the search range ("YES" at step 92), the selected prescribed coefficients ($\alpha 2$, $\alpha 1$) are used to multiply the R and G components, respectively, of the skin-tone-area representative value (tfR, tfG, tfB) (step 51) and conversion is made to the chromaticity value [the coefficient-multiplied skin-tone-area representative chromaticity value ($r_1$,$b_1$) is calculated] (step 52). In a manner similar to that of the first embodiment, the processing for detecting gray pixels is executed utilizing the coefficient-multiplied skin-tone-area representative chromaticity value ($r_1$,$b_1$) and the data, which has been stored in the memory 26, representing the skin-tone—blackbody locus H and the gray—blackbody locus G (see FIG. 20). It goes without saying that the prescribed coefficients ($\alpha 2$, $\alpha 1$) belonging to the above-mentioned search range are calculated (selected) in the processing (step 62 in FIG. 20) for calculating the prescribed coefficients ($\alpha 2$, $\alpha 1$) for which the number N of gray candidate pixels is maximized.

Modification

In the second embodiment, a number of prescribed coefficients ($\alpha 2$, $\alpha 1$) are differentiated as being those that do and do not belong to a search range based upon the distance L between the point C ($r_n$,$b_n$) on the skin-tone—blackbody locus H nearest the skin-tone-area representative chromaticity value A ($r_0$,$b_0$) and each of the number of coefficient-multiplied skin-tone-area representative chromaticity values D ($r_1$,$b_1$) obtained using a number of prescribed coefficients ($\alpha 2$, $\alpha 1$) (see FIG. 18). In this modification, instead of a number of prescribed coefficients ($\alpha 2$, $\alpha 1$) being differentiated as those that do and do not belong to a search range, each of a number of prescribed coefficients ($\alpha 2$, $\alpha 1$) is assigned a weight w.

The weight w regarding each of a number of prescribed coefficients ($\alpha 2$,$\alpha 1$) is calculated according to the following equations:

$$w(\alpha 2,\alpha 1)=1-10 \cdot L \text{ (in a case where } L \leq 0.1 \text{ holds)}$$

$$w(\alpha 2,\alpha 1)=0 \text{ (in a case where } L>0.1 \text{ holds)} \qquad \text{Eq. (10)}$$

In Equation (10), L represents the distance between the point C ($r_n$,$b_n$) on the skin-tone—blackbody locus H nearest the skin-tone-area representative chromaticity value A ($r_0$,$b_0$) and each of the number of coefficient-multiplied skin-tone-area representative chromaticity values D ($r_1$,$b_1$) obtained using the prescribed coefficients ($\alpha 2$, $\alpha 1$).

In a case where weight w is used, an evaluation function value that employs the calculated number N of gray candidate pixels is calculated. An evaluation functional equation f($\alpha 2$, $\alpha 1$) is represented by the following equation:

$$f(\alpha 2,\alpha 1)=-w(\alpha 2,\alpha 1) \cdot N \qquad \text{Eq. (11)}$$

It will suffice if the evaluation function is one such that the larger the weighting coefficient w, the smaller the evaluation function value, and the greater the number N of gray candidate pixels, the smaller the evaluation function value. For example, the evaluation functional equation may expressed by the following equation:

$$f(\alpha 2,\alpha 1)=-w(\alpha 2,\alpha 1) \cdot \log_{10}(1+N) \qquad \text{Eq. (12)}$$

In a case where the weighting w and evaluation functional equation f are used, prescribed coefficients ($\alpha 2$, $\alpha 1$) for which the evaluation functional value f($\alpha 2$,$\alpha 1$) will be minimized are searched for instead of the prescribed coefficients ($\alpha 2$,$\alpha 1$) for which the number N of gray candidate pixels is maximized (step 62 in FIG. 20).

Figure 21:
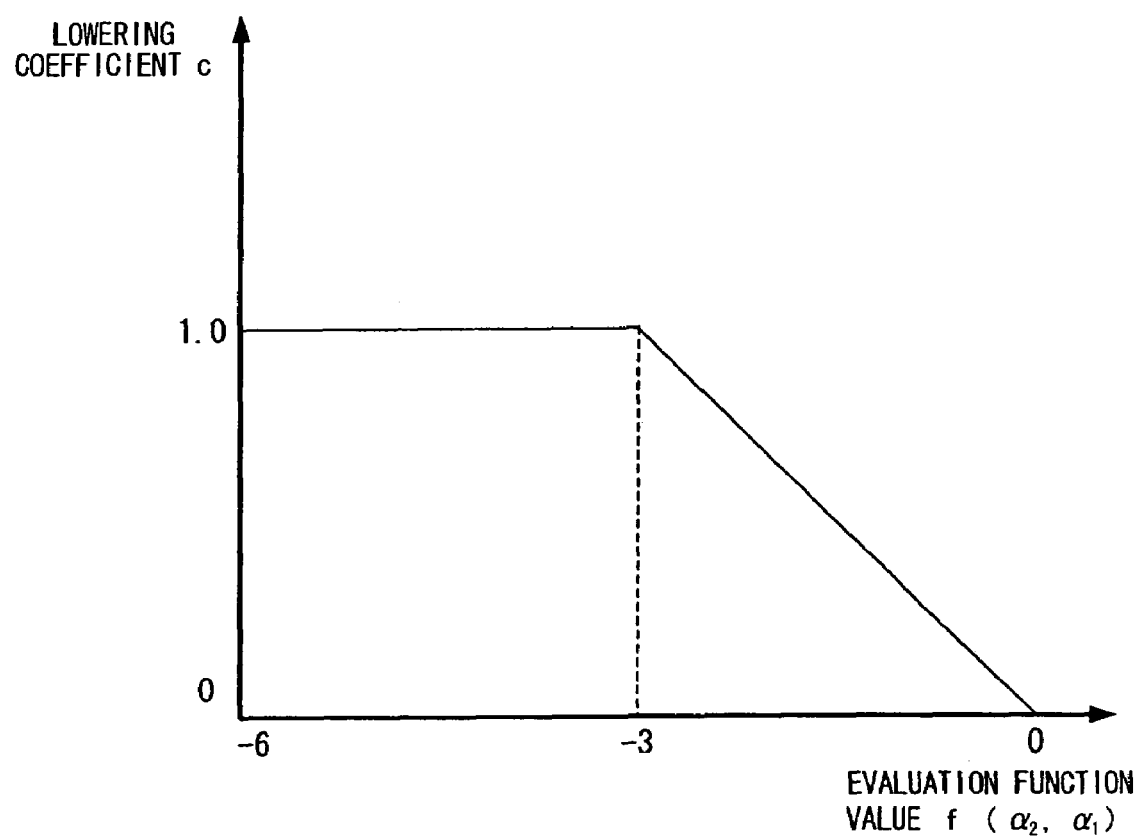
FIG. 21 illustrates the relationship between an evaluation function value and the lowering coefficient c.

If the evaluation functional value f($\alpha 2$,$\alpha 1$) is large, there is a possibility that erroneous gray pixels are being detected. In such case the lowering coefficient c may be calculated in accordance with the evaluation functional value f($\alpha 2$,$\alpha 1$) and the white balance correction coefficients may be corrected by the lowering coefficient c calculated. FIG. 21 is a graph (look-up table) representing the relationship between the evaluation functional value f($\alpha 2$,$\alpha 1$) and the lowering coefficient c.

It should be noted that the graph representing the relationship between the evaluation functional value f($\alpha 2$,$\alpha 1$) and the lowering coefficient c shown in FIG. 21 is for a case where the evaluation functional equation has been defined in such a manner that the larger the weighting coefficient w, the smaller the evaluation function value f, and the greater the number of gray candidate pixels, the smaller the evaluation function value f. It goes without saying that in a case where the evaluation functional equation has been defined in such a manner that the larger the weighting coefficient w, the larger the evaluation function value f, and the greater the number of gray candidate pixels, the larger the evaluation function value f, the lowering coefficient c should be made a monotonously increasing function with respect to the evaluation functional value f($\alpha 2$,$\alpha 1$).

In the modification of the second embodiment described above, the weight w regarding each of the number of prescribed coefficients ($\alpha2,\alpha1$) is calculated. Instead of this arrangement, however, an arrangement may be adopted in which the number of prescribed coefficients ($\alpha2,\alpha1$) are differentiated into those that do and do not belong to a search range based upon the distance L between the point C ($r_n,b_n$) on the skin-tone —blackbody locus H nearest the skin-tone-area representative chromaticity value A ($r_0,b_0$) and each of the number of coefficient-multiplied skin-tone-area representative chromaticity values D ($r_1,b_1$), and the weight w is calculated only with regard to the prescribed coefficients ($\alpha2,\alpha1$) that belong to the search range.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
skin-tone image area detecting means for detecting a skin-tone image area, which is contained in an image represented by applied image data, based upon image shape or image structure;
gray pixel detecting means for detecting gray pixels contained in the image represented by the image data based upon color information obtained from pixels that constitute the skin-tone image area that has been detected by said skin-tone image area detecting means; and
color temperature estimating means for estimating color temperature of a photographic light source based upon gray pixels that have been detected by said gray pixel detecting means;
wherein said gray pixel detecting means includes:
first coefficient multiplying means for multiplying a representative value of color information obtained from pixels constituting the skin-tone image area by prescribed coefficients;
first chromaticity value converting means for converting the coefficient-multiplied skin-tone-area representative value, which has been calculated by said first coefficient multiplying means, to a representative chromaticity value;
determination means for determining whether the coefficient-multiplied skin-tone-area representative chromaticity value obtained by said first chromaticity value converting means lies within a zone in the vicinity of a skin-tone—blackbody locus;
provisional color temperature estimating means for estimating that a color temperature corresponding to a point on the skin-tone—blackbody locus nearest the coefficient-multiplied skin-tone-area representative chromaticity value is a provisional color temperature if said determination means has determined that the coefficient-multiplied skin-tone-area representative chromaticity value lies within the zone in the vicinity of the skin-tone—blackbody locus;
second coefficient multiplying means for multiplying color information, which is obtained from each pixel constituting the image represented by the image data, by the prescribed coefficients that will cause the coefficient-multiplied skin-tone-area representative chromaticity value to fall within the zone in the vicinity of the skin-tone—blackbody locus; and
second chromaticity value converting means for converting a plurality of coefficient-multiplied pixel values, which have been obtained by said second coefficient multiplying means, to chromaticity values;
wherein from among the pixels that constitute the image represented by the image data, there are specified pixels for which the coefficient-multiplied pixel chromaticity values obtained by said second chromaticity value converting means will fall within a zone in the vicinity of a point on a gray—blackbody locus corresponding to the provisional color temperature that has been estimated by said provisional color temperature estimating means, and the specific pixels are detected as gray pixels.

2. The apparatus according to claim 1, further comprising optimizing coefficient searching means for searching for the prescribed coefficients, which will cause the coefficient-multiplied skin-tone-area representative chromaticity values to fall within the zone in the vicinity of the skin-tone—blackbody locus, and for which the number of gray pixels is maximized;
said first and second coefficient multiplying means using the prescribed coefficients found by said optimization coefficient searching means.

3. The apparatus according to claim 1, wherein said color temperature estimating means calculates the color temperature of each gray pixel that has been detected by said gray pixel detecting means, and adopts an average value of the calculated color temperatures as the color temperature of the photographic light source.

4. The apparatus according to claim 1, further comprising:
white balance correction value calculating means for calculating a white balance correction value based upon the color temperature of the photographic light source that has been estimated by said color temperature estimating means; and
white balance correcting means for applying a white balance correction to the image data using the correction value that has been calculated by said white balance correction value calculating means.

5. The apparatus according to claim 4, further comprising first lowering means for correcting the white balance correction value so as to weaken the correction effect of the white balance correction in a case where the difference between a representative value of a skin-tone image area that has been subjected to a white balance correction by said white balance correcting means and a skin-tone image reference value is greater than a prescribed value.

6. The apparatus according to claim 4, further comprising a first lowering means for correcting the white balance correction value so as to weaken the correction effect of the white balance correction in a case where the number of gray pixels detected by said gray pixel detecting means is less than a prescribed value.

7. An image processing apparatus comprising:
skin-tone image area detecting means for detecting a skin-tone image area, which is contained in an image represented by applied image data, based upon image shape or image structure;
gray pixel detecting means for detecting gray pixels contained in the image represented by the image data based upon color information obtained from pixels that constitute the skin-tone image area that has been detected by said skin-tone image area detecting means;
color temperature estimating means for estimating color temperature of a photographic light source based upon gray pixels that have been detected by said gray pixel detecting means;
color temperature range narrowing means which, based upon the color information obtained from the pixels that constitute the skin-tone image area detected by said skin-tone image area detecting means, is for narrowing a range of color temperatures of a photographic light source that are to be possessed by gray pixels to be detected;

said gray pixel detecting means adopting pixels, which possess color temperatures that fall within the range of color temperatures narrowed by said color temperature range narrowing means, as detection candidates, and detecting gray pixels from among these detection candidates;

wherein said color temperature range narrowing means includes:

a first coefficient multiplying means for multiplying a representative value of color information, which is obtained from the pixels that constitute the skin-tone image area that has been detected by said skin-tone image area detecting means, by each of a plurality of prescribed coefficients;

a first chromaticity value converting means for converting a plurality of the coefficient-multiplied skin-tone-area representative values, which have been calculated by said first coefficient multiplying means, to representative chromaticity values; and coefficient range searching means for searching for a range of the prescribed coefficients used in calculation of the coefficient-multiplied skin-tone-area representative chromaticity values, these prescribed coefficients being such that distances between the plurality of coefficient-multiplied skin-tone-area representative chromaticity values obtained by said first chromaticity value converting means to a value on the skin-tone—blackbody locus nearest a skin-tone-area representative chromaticity value obtained by conversion, to a chromaticity value, of a representative value of color information obtained from the pixels that constitute the skin-tone image area, will fall within a prescribed distance.

8. An image processing apparatus comprising:

skin-tone image area detecting means for detecting a skin-tone image area, which is contained in an image represented by applied image data, based upon image shape or image structure;

gray pixel detecting means for detecting gray pixels contained in the image represented by the image data based upon color information obtained from pixels that constitute the skin-tone image area that has been detected by said skin-tone image area detecting means; and color temperature estimating means for estimating color temperature of a photographic light source based upon gray pixels that have been detected by said gray pixel detecting means;

wherein said color temperature range narrowing means includes:

a first coefficient multiplying means for multiplying a representative value of color information, which is obtained from the pixels that constitute the skin-tone image area that has been detected by said skin-tone image area detecting means, by each of a plurality of prescribed coefficients;

a first chromaticity value converting means for converting a plurality of the coefficient-multiplied skin-tone-area representative values, which have been calculated by said first coefficient multiplying means, to representative chromaticity values; and weighting means for calculating distances between the plurality of coefficient-multiplied skin-tone-area representative chromaticity values obtained by said first coefficient converting means, and a value on the skin-tone—blackbody locus nearest a skin-tone-area representative chromaticity value obtained by conversion, to a chromaticity value, of a representative value of color information obtained from the pixels that constitute the skin-tone image area, and weighting each of the plurality of prescribed coefficients in accordance with the distances calculated; and said gray pixel detecting means includes:

a second coefficient multiplying means for multiplying a representative value of color temperature obtained from the pixels that constitute the skin-tone image area by the prescribed coefficients;

a second chromaticity value converting means for converting the coefficient-multiplied skin-tone-area representative value, which has been calculated by said second coefficient multiplying means, to a representative chromaticity value;

determination means for determining whether the coefficient-multiplied skin-tone-area representative chromaticity value obtained by said second chromaticity value converting means lies within a zone in the vicinity of the skin-tone—blackbody locus;

provisional color temperature estimating means for estimating that a color temperature corresponding to a point on the skin-tone—blackbody locus nearest the coefficient-multiplied skin-tone-area representative chromaticity value is a provisional color temperature if said determination means has determined that the coefficient-multiplied skin-tone-area representative chromaticity value lies within the zone in the vicinity of the skin-tone—blackbody locus;

third coefficient multiplying means for multiplying color information, which is obtained from the pixels that constitute the image represented by the image data, by prescribed coefficients that will cause the coefficient-multiplied skin-tone-area representative chromaticity value to fall within the zone in the vicinity of the skin-tone—blackbody locus;

third chromaticity value converting means for converting a plurality of coefficient-multiplied pixel values, which have been obtained by said third coefficient multiplying means, to chromaticity values;

wherein from among the pixels that constitute the image represented by the image data, there are specified pixels for which the coefficient-multiplied pixel chromaticity values obtained by said third chromaticity value converting means will fall within a zone in the vicinity of a point on a gray—blackbody locus corresponding to the provisional color temperature that has been estimated by said provisional color temperature estimating means, and the specific pixels are detected as gray pixels;

means for calculating an evaluation function value based upon number of gray pixels detected by said gray pixel detecting means and weights of the prescribed coefficients used in said second and third coefficient calculating means, by using such an evaluation function that the larger the number of gray pixels detected by said gray pixel detecting means, the smaller the value of the function, and the larger the weight regarding the prescribed coefficients, the smaller the value of the function; and optimizing coefficient searching means for searching for prescribed coefficients for which the evaluation function value will be minimized;

said second and third coefficient multiplying means using the prescribed coefficients found by said optimizing coefficient searching means.

9. An image processing apparatus comprising:

skin-tone image area detecting means for detecting a skin-tone image area, which is contained in an image represented by applied image data, based upon image shape or image structure;

gray pixel detecting means for detecting gray pixels contained in the image represented by the image data based upon color information obtained from pixels that constitute the skin-tone image area that has been detected by said skin-tone image area detecting means;

color temperature estimating means for estimating color temperature of a photographic light source based upon gray pixels that have been detected by said gray pixel detecting means;

color temperature range narrowing means which, based upon the color information obtained from the pixels that constitute the skin-tone image area detected by said skin-tone image area detecting means, is for narrowing a range of color temperatures of a photographic light source that are to be possessed by gray pixels to be detected;

said gray pixel detecting means adopting pixels. which possess color temperatures that fall within the range of color temperatures narrowed by said color temperature range narrowing means, as detection candidates, and detecting gray pixels from among these detection candidates;

wherein a first coefficient multiplying means for multiplying a representative value of color information, which is obtained from the pixels that constitute the skin-tone image area that has been detected by said skin-tone image area detecting means, by each of a plurality of prescribed coefficients;

a first chromaticity value converting means for converting a plurality of the coefficient-multiplied skin-tone-area representative values, which have been calculated by said first coefficient multiplying means, to representative chromaticity values; and weighting means for calculating distances between the plurality of coefficient-multiplied skin-tone-area representative chromaticity values obtained by said first coefficient converting means, and a value on the skin-tone—blackbody locus nearest a skin-tone-area representative chromaticity value obtained by conversion, to a chromaticity value, of a representative value of color information obtained from the pixels that constitute the skin-tone image area, and weighting each of the plurality of prescribed coefficients in accordance with the distances calculated; and said gray pixel detecting means includes:

a second coefficient multiplying means for multiplying a representative value of color temperature obtained from the pixels that constitute the skin-tone image area by the prescribed coefficients;

a second chromaticity value converting means for converting the coefficient-multiplied skin-tone-area representative value, which has been calculated by said second coefficient multiplying means, to a representative chromaticity value;

determination means for determining whether the coefficient-multiplied skin-tone-area representative chromaticity value obtained by said second chromaticity value converting means lies within a zone in the vicinity of the skin-tone—blackbody locus;

provisional color temperature estimating means for estimating that a color temperature corresponding to a point on the skin-tone—blackbody locus nearest the coefficient-multiplied skin-tone-area representative chromaticity value is a provisional color temperature if said determination means has determined that the coefficient-multiplied skin-tone-area representative chromaticity value lies within the zone in the vicinity of the skin-tone—blackbody locus;

a third coefficient multiplying means for multiplying color information, which is obtained from the pixels that constitute the image represented by the image data, by prescribed coefficients that will cause the coefficient-multiplied skin-tone-area representative chromaticity value to fall within the zone in the vicinity of the skin-tone—blackbody locus;

a third chromaticity value converting means for converting a plurality of coefficient-multiplied pixel values, which have been obtained by said third coefficient multiplying means, to chromaticity values;

wherein from among the pixels that constitute the image represented by the image data, there are specified pixels for which the coefficient-multiplied pixel chromaticity values obtained by said third chromaticity value converting means will fall within a zone in the vicinity of a point on a gray—blackbody locus corresponding to the provisional color temperature that has been estimated by said provisional color temperature estimating means, and the specific pixels are detected as gray pixels;

means for calculating an evaluation function value based upon number of gray pixels detected by said gray pixel detecting means and weights of the prescribed coefficients used in said second and third coefficient calculating means, by using such an evaluation function that the larger the number of gray pixels detected by said gray pixel detecting means, the smaller the value of the function, and the larger the weight regarding the prescribed coefficients, the smaller the value of the function; and optimizing coefficient searching means for searching for prescribed coefficients for which the evaluation function value will be minimized;

said second and third coefficient multiplying means using the prescribed coefficients found by said optimizing coefficient searching means.

10. An image processing method comprising the steps of:

detecting a skin-tone image area, which is contained in an image represented by applied image data, based upon image shape or image structure;

detecting gray pixels contained in the image represented by the image data based upon color information obtained from pixels that constitute the skin-tone image area that has been detected; and estimating color temperature of a photographic light source based upon gray pixels that have been detected;

wherein the step of detecting gray pixels includes:

multiplying a representative value of color information obtained from pixels constituting the skin-tone image area by prescribed coefficients;

converting the coefficient-multiplied skin-tone-area representative value to a representative chromaticity value;

determining whether the coefficient-multiplied skin-tone-area representative chromaticity value lies within a zone in the vicinity of a skin-tone—blackbody locus;

estimating that a color temperature corresponding to a point on the skin-tone—blackbody locus nearest the coefficient-multiplied skin-tone-area representative chromaticity value is a provisional color temperature if it is determined that the coefficient-multiplied skin-tone-area representative chromaticity value lies within the zone in the vicinity of the skin-tone—blackbody locus;

multiplying color information, which is obtained from each pixel constituting the image represented by the image data, by the prescribed coefficients that will cause the coefficient-multiplied skin-tone-area representative chromaticity value to fall within the zone in the vicinity of the skin-tone—blackbody locus; and converting a plurality of coefficient-multiplied pixel values to chromaticity values;

wherein from among the pixels that constitute the image represented by the image data, there are specified pixels for which the coefficient-multiplied pixel chromaticity values will fall within a zone in the vicinity of a point on a gray—blackbody locus corresponding to the provisional color temperature that has been estimated, and the specific pixels are detected as gray pixels.

11. A computer-executable image processing program embodied in a computer readable medium for causing a computer to execute:

skin-tone image area detection processing for detecting a skin-tone image area, which is contained in an image represented by applied image data, based upon image shape or image structure;

gray pixel detection processing for detecting gray pixels contained in the image represented by the image data based upon color information obtained from pixels that constitute the skin-tone image area that has been detected by said skin-tone image area detection processing; and color temperature estimation processing for estimating color temperature of a photographic light source based upon gray pixels that have been detected by said gray pixel detection processing;

wherein said gray pixel detection processing includes:

first coefficient multiplication processing for multiplying a representative value of color information obtained from pixels constituting the skin-tone image area by prescribed coefficients;

first chromaticity value conversion processing for converting the coefficient-multiplied skin-tone-area representative value, which has been calculated by said first coefficient multiplication processing, to a representative chromaticity value;

determination processing for determining whether the coefficient-multiplied skin-tone-area representative chromaticity value obtained by said first chromaticity value conversion processing lies within a zone in the vicinity of a skin-tone—blackbody locus;

provisional color temperature estimation processing for estimating that a color temperature corresponding to a point on the skin-tone—blackbody locus nearest the coefficient-multiplied skin-tone-area representative chromaticity value is a provisional color temperature if said determination processing has determined that the coefficient-multiplied skin-tone-area representative chromaticity value lies within the zone in the vicinity of the skin-tone—blackbody locus;

second coefficient multiplication processing for multiplying color information, which is obtained from each pixel constituting the image represented by the image data, by the prescribed coefficients that will cause the coefficient-multiplied skin-tone-area representative chromaticity value to fall within the zone in the vicinity of the skin-tone—blackbody locus; and second chromaticity value conversion processing for converting a plurality of coefficient-multiplied pixel values, which have been obtained by said second coefficient multiplication processing, to chromaticity values;

wherein from among the pixels that constitute the image represented by the image data, there are specified pixels for which the coefficient-multiplied pixel chromaticity values obtained by said second chromaticity value conversion processing will fall within a zone in the vicinity of a point on a gray—blackbody locus corresponding to the provisional color temperature that has been estimated by said provisional color temperature estimation processing, and the specific pixels are detected as gray pixels.

12. The program according to claim 11, wherein the skin-tone image area detection processing comprises an algorithm that detects a skin-tone image area, which is contained in an image represented by applied image data, based upon image shape or image structure;

wherein the gray pixel detection processing comprises an algorithm that detects gray pixels contained in the image represented by the image data based upon color information obtained from pixels that constitute the skin-tone image area that has been detected by said skin-tone image area detection processing; and wherein the color temperature estimation processing comprises an algorithm that estimates color temperature of a photographic light source based upon gray pixels that have been detected by said gray pixel detection processing.

13. An image processing apparatus comprising:

a skin-tone image area detector that detects a skin-tone image area, which is contained in an image represented by applied image data, based upon image shape or image structure;

a gray pixel detector that detects gray pixels contained in the image represented by the image data based upon color information obtained from pixels that constitute the skin-tone image area that has been detected by said skin-tone image area detector; and a color temperature estimator that estimates color temperature of a photographic light source based upon gray pixels that have been detected by said gray pixel detector;

wherein said gray pixel detector includes:

a first coefficient multiplier that multiplies a representative value of color information obtained from pixels constituting the skin-tone image area by prescribed coefficients;

a first chromaticity value converter that converts the coefficient-multiplied skin-tone-area representative value, which has been calculated by said first coefficient multiplier, to a representative chromaticity value;

a determiner that determines whether the coefficient-multiplied skin-tone-area representative chromaticity value obtained by said first chromaticity value converter lies within a zone in the vicinity of a skin-tone—blackbody locus;

a provisional color temperature estimator that estimates a color temperature corresponding to a point on the skin-tone—blackbody locus nearest the coefficient-multiplied skin-tone-area representative chromaticity value is a provisional color temperature if said determiner has determined that the coefficient-multiplied skin-tone-area representative chromaticity value lies within the zone in the vicinity of the skin-tone—blackbody locus;

a second coefficient multiplier that multiplies color information, which is obtained from each pixel constituting the image represented by the image data, by the prescribed coefficients that will cause the coefficient-multiplied skin-tone-area representative chromaticity value to fall within the zone in the vicinity of the skin-tone—blackbody locus; and a second chromaticity value converter that converts a plurality of coefficient-multiplied pixel values, which have been obtained by said second coefficient multiplier, to chromaticity values;

wherein from among the pixels that constitute the image represented by the image data, there are specified pixels for which the coefficient-multiplied pixel chromaticity values obtained by said second chromaticity value converter will fall within a zone in the vicinity of a point on a gray—blackbody locus corresponding to the provisional color temperature that has been estimated by said provisional color temperature estimator, and the specific pixels are detected as gray pixels.

* * * * *